(12) United States Patent  
Giganti et al.

(10) Patent No.: US 8,838,873 B2
(45) Date of Patent: Sep. 16, 2014

(54) METHODS AND APPARATUS FOR DATA ACCESS BY A REPROGRAMMABLE CIRCUIT MODULE

(75) Inventors: John J. Giganti, Damascus, MD (US); Andrew Huo, Rockville, MD (US); Richard A. Baum, Rockville, MD (US); John M. Cavallo, Beltsville, MD (US); Timothy P. Bresnan, Finksburg, MD (US); Charles A. Moses, West Friendship, MD (US); Madhu Siddalingaiah, Clarksburg, MD (US)

(73) Assignee: Data Design Corporation, Gaithersburg, MD (US)

( * ) Notice: Subject to any disclaimer, the term of this patent is extended or adjusted under 35 U.S.C. 154(b) by 0 days.

(21) Appl. No.: 13/532,319

(22) Filed: Jun. 25, 2012

(65) Prior Publication Data

US 2012/0324149 A1 Dec. 20, 2012

Related U.S. Application Data

(63) Continuation of application No. PCT/US2012/042143, filed on Jun. 13, 2012, which is a continuation-in-part of application No. 13/161,141, filed on Jun. 15, 2011.

(51) Int. Cl.
*G06F 12/00* (2006.01)
*G06F 12/06* (2006.01)
*G06F 13/16* (2006.01)

(52) U.S. Cl.
CPC ........ *G06F 13/1668* (2013.01); *G06F 12/0607* (2013.01)
USPC .................................. 711/5; 711/2; 711/170

(58) Field of Classification Search
USPC .................................................. 711/2, 5, 170
See application file for complete search history.

(56) References Cited

U.S. PATENT DOCUMENTS 5,479,638 A 12/1995 Assar et al.
5,862,223 A 1/1999 Walker et al.
(Continued)

FOREIGN PATENT DOCUMENTS

EP 2535820 A2 12/2012
GB 2 352 548 A 1/2001
(Continued)

OTHER PUBLICATIONS

Search Examination Report dated Oct. 15, 2012 for UK Patent Application No. 1210639.9.

(Continued)

*Primary Examiner* — Gurtej Bansal
(74) *Attorney, Agent, or Firm* — Cooley LLP

(57) ABSTRACT

In some embodiments, an apparatus includes a set of memory modules configured to store data and a reprogrammable circuit module operatively coupled to the set of memory modules. The reprogrammable circuit module is configured to receive, from a host device, information associated with a search request. The reprogrammable circuit module is configured to change from a first configuration to a second configuration in response to receiving the information. The reprogrammable circuit module is configured to retrieve at least a portion of the data stored at the set of memory modules associated with the second configuration. The reprogrammable circuit module is configured to generate a search result based on the portion of the data, and transmit the search result to the host device.

20 Claims, 7 Drawing Sheets

(56) References Cited

U.S. PATENT DOCUMENTS

| | | |
|---|---|---|
| 6,611,894 B1 | 8/2003 | Onoo |
| 6,640,220 B1 | 10/2003 | Firlit et al. |
| 7,202,801 B2 | 4/2007 | Chou |
| 7,452,236 B2 | 11/2008 | Verdiell et al. |
| 7,464,088 B1 | 12/2008 | Chiang |
| 7,500,055 B1 | 3/2009 | Oesterreicher et al. |
| 7,542,867 B2 | 6/2009 | Steger et al. |
| 7,562,162 B2 | 7/2009 | Kreiner et al. |
| 7,657,453 B2 | 2/2010 | Guldner et al. |
| 7,713,068 B2 | 5/2010 | Flynn et al. |
| 7,752,346 B2 | 7/2010 | Talayco et al. |
| 7,778,020 B2 | 8/2010 | Flynn et al. |
| 7,827,346 B2 | 11/2010 | Anderson |
| 7,830,732 B2 | 11/2010 | Moshayedi et al. |
| 7,831,606 B2 | 11/2010 | Pandya |
| 7,836,226 B2 | 11/2010 | Flynn et al. |
| 7,890,692 B2 | 2/2011 | Pandya |
| 7,934,033 B2 | 4/2011 | Malwankar et al. |
| 7,934,055 B2 | 4/2011 | Flynn et al. |
| 8,015,440 B2 | 9/2011 | Flynn et al. |
| 8,019,938 B2 | 9/2011 | Flynn et al. |
| 8,019,940 B2 | 9/2011 | Flynn et al. |
| 8,046,500 B2 | 10/2011 | Flynn et al. |
| 8,051,022 B2 | 11/2011 | Pandya |
| 8,074,011 B2 | 12/2011 | Flynn et al. |
| 8,103,137 B2 | 1/2012 | Kirkpatrick et al. |
| 8,134,875 B2 | 3/2012 | Baxter |
| 8,140,739 B2 | 3/2012 | Langlois et al. |
| 8,250,271 B2 | 8/2012 | Swing et al. |
| 2001/0047394 A1 | 11/2001 | Kloba et al. |
| 2002/0065902 A1 | 5/2002 | Janik et al. |
| 2003/0204664 A1 | 10/2003 | Bennett |
| 2003/0225942 A1 | 12/2003 | Cheon |
| 2004/0143716 A1 | 7/2004 | Hong |
| 2004/0177256 A1 | 9/2004 | Kobayashi |
| 2005/0198449 A1* | 9/2005 | Haskell et al. .............. 711/156 |
| 2006/0034461 A1 | 2/2006 | Park |
| 2006/0294059 A1 | 12/2006 | Chamberlain et al. |
| 2007/0055831 A1* | 3/2007 | Beeston et al. ............. 711/154 |
| 2007/0143532 A1 | 6/2007 | Gorobets et al. |
| 2008/0140724 A1 | 6/2008 | Flynn et al. |
| 2008/0140909 A1 | 6/2008 | Flynn et al. |
| 2008/0140910 A1 | 6/2008 | Flynn et al. |
| 2008/0140932 A1 | 6/2008 | Flynn et al. |
| 2008/0140945 A1 | 6/2008 | Salessi et al. |
| 2008/0141043 A1 | 6/2008 | Flynn et al. |
| 2008/0183688 A1 | 7/2008 | Chamdani et al. |
| 2008/0183882 A1 | 7/2008 | Flynn et al. |
| 2008/0183953 A1 | 7/2008 | Flynn et al. |
| 2008/0228740 A1 | 9/2008 | Weiss et al. |
| 2008/0263114 A1* | 10/2008 | Nath et al. ................. 707/206 |
| 2008/0313312 A1 | 12/2008 | Flynn et al. |
| 2008/0313364 A1 | 12/2008 | Flynn et al. |
| 2009/0012957 A1* | 1/2009 | Villaret et al. .................. 707/6 |
| 2009/0094218 A1* | 4/2009 | Zhang et al. ..................... 707/5 |
| 2009/0122949 A1 | 5/2009 | Reid et al. |
| 2009/0150605 A1 | 6/2009 | Flynn et al. |
| 2009/0150641 A1 | 6/2009 | Flynn et al. |
| 2009/0150744 A1 | 6/2009 | Flynn et al. |
| 2009/0245245 A1 | 10/2009 | Malwankar et al. |
| 2009/0254705 A1 | 10/2009 | Abali et al. |
| 2009/0259800 A1 | 10/2009 | Kilzer et al. |
| 2009/0282301 A1 | 11/2009 | Flynn et al. |
| 2009/0287956 A1 | 11/2009 | Flynn et al. |
| 2009/0296859 A1 | 12/2009 | Faulhaber et al. |
| 2010/0023675 A1 | 1/2010 | Chen et al. |
| 2010/0031000 A1 | 2/2010 | Flynn et al. |
| 2010/0095064 A1 | 4/2010 | Aviles |
| 2010/0115174 A1 | 5/2010 | Akyol et al. |
| 2010/0122019 A1 | 5/2010 | Flynn et al. |
| 2010/0122148 A1 | 5/2010 | Flynn et al. |
| 2010/0211737 A1 | 8/2010 | Flynn et al. |
| 2010/0235715 A1 | 9/2010 | Thatcher et al. |
| 2010/0254096 A1 | 10/2010 | Kim et al. |
| 2010/0254100 A1 | 10/2010 | Kim et al. |
| 2010/0254703 A1 | 10/2010 | Kirkpatrick et al. |
| 2010/0262762 A1 | 10/2010 | Borchers et al. |
| 2010/0293439 A1 | 11/2010 | Flynn et al. |
| 2010/0293440 A1 | 11/2010 | Thatcher et al. |
| 2011/0022801 A1 | 1/2011 | Flynn et al. |
| 2011/0029695 A1 | 2/2011 | Kishore et al. |
| 2011/0035540 A1 | 2/2011 | Fitzgerald et al. |
| 2011/0047356 A2 | 2/2011 | Flynn et al. |
| 2011/0047437 A1 | 2/2011 | Flynn |
| 2011/0055433 A1 | 3/2011 | Kishore et al. |
| 2011/0055471 A1 | 3/2011 | Thatcher et al. |
| 2011/0058440 A1 | 3/2011 | Smith et al. |
| 2011/0060887 A1 | 3/2011 | Thatcher et al. |
| 2011/0060927 A1 | 3/2011 | Fillingim et al. |
| 2011/0066808 A1 | 3/2011 | Flynn et al. |
| 2011/0072302 A1 | 3/2011 | Sartore |
| 2011/0119423 A1 | 5/2011 | Kishore et al. |
| 2011/0157992 A1 | 6/2011 | Strasser et al. |
| 2011/0179225 A1 | 7/2011 | Flynn et al. |
| 2011/0182119 A1 | 7/2011 | Strasser et al. |
| 2011/0197014 A1 | 8/2011 | Yeh |
| 2011/0252190 A1 | 10/2011 | Flynn et al. |
| 2011/0258391 A1 | 10/2011 | Atkisson et al. |
| 2011/0258512 A1 | 10/2011 | Flynn et al. |
| 2011/0289267 A1 | 11/2011 | Flynn et al. |
| 2011/0296133 A1 | 12/2011 | Flynn et al. |
| 2011/0296277 A1 | 12/2011 | Flynn et al. |
| 2011/0307758 A1 | 12/2011 | Filligim |
| 2011/0314354 A1 | 12/2011 | Fillingim |
| 2012/0005443 A1 | 1/2012 | Flynn et al. |
| 2012/0011340 A1 | 1/2012 | Flynn et al. |
| 2012/0030408 A1 | 2/2012 | Flynn et al. |
| 2012/0239854 A1 | 9/2012 | Hsueh et al. |
| 2012/0324143 A1 | 12/2012 | Giganti et al. |

FOREIGN PATENT DOCUMENTS

| | | |
|---|---|---|
| WO | WO 98/57489 A2 | 12/1998 |
| WO | WO 2005/026925 A2 | 3/2005 |
| WO | WO 2008/077284 | 7/2008 |
| WO | WO 2012/174043 A1 | 12/2012 |

OTHER PUBLICATIONS

European Search Report mailed Jan. 8, 2013 for European Application No. EP12172152.6.

International Search Report and Written Opinion mailed Nov. 8, 2012 for PCT Application No. PCT/US2012/042143.

Singh, et al., "Technical Overview & Comparative Study of Modern Tablet Computers from Different Vendors Like Apple, Samsung & HTC.," publication date May 24, 2011 Retrieved from the Internet: <URL: http://www-scf.usc.edu/~shailend/EE532ProjectReport.pdf,> 19 pgs.

Liu et al., "Run-Time Partial Reconfiguration Speed Investigation and Architectural Design Space Exploration," published in: Field Programmable Logic and Applications, 2009, FPL 2009, IEEE, Retrieved from the Internet: <URL: http://web.it.kth.se/~mingliu/publications/fp109.pdf,> 5 pgs.

Office Action for U.S. Appl. No. 13/161,141, mailed Sep. 9, 2013, 19 pages.

Office Action for European Application No. 12172152.6, mailed Dec. 13, 2013, 5 pages.

Examination Report for United Kingdom Application No. 1210639.9, dated Jan. 27, 2014, 8 pages.

Further Search Examination Report Relating to Claims 12 to 19 for United Kingdom Application No. 1210639.9, dated Jan. 22, 2014, 1 page.

Further Search Examination Report Relating to Claims 27 to 41 for United Kingdom Application No. 1210639.9, dated Jan. 24, 2014, 1 page.

Further Search Examination Report Relating to Claims 42 to 46 for United Kingdom Application No. 1210639.9, dated Jan. 24, 2014, 1 page.

Office Action mailed Mar. 14, 2013, for U.S. Appl. No. 13/161,141, filed Jun. 15, 2011.

(56) References Cited

OTHER PUBLICATIONS

Examination Report for United Kingdom Application No. 1210639.9, dated Jul. 2, 2014, 4 pages.

Wikipedia, "Field-programmable gate array," Retrieved from the internet: URL: <http://en.wikipedia.org/wiki/Field-programmable_gate_array> [Cited on Jul. 2, 2014 in GB1210639.9 Examination Report], 17 pages.

* cited by examiner

500

```
Receive a query associated with a data lookup, the query
includes a first logical memory address and a second logical
memory address
502
```

↓

```
Retrieve a first physical memory address associated with the
first logical memory address, the first physical memory
address is associated with a memory location at a first
memory module coupled to a reprogrammable circuit module
by a first data channel
504
```

↓

```
Retrieve a second physical memory address associated with
the second logical memory address, the second physical
memory address is associated with a memory location at a
second memory module coupled to the reprogrammable
circuit module by a second data channel
506
```

↓

```
Access, during a first time period, the first memory module
via the first data channel using the first physical memory
address
508
```

↓

```
Access, during a second time period overlapping the first time
period, the second memory module via the second data
channel using the second physical memory address
510
```

```
Receive, at a reprogrammable circuit module, a query
associated with a data lookup, the query including a first data
item and a second data item.
802
```

```
Determine a first physical memory address using the first data
item as an input to a hash function, the first physical memory
address being associated with a memory location at a first
memory module coupled to the reprogrammable circuit
module.
804
```

```
Determine a second physical memory address using the
second data item as an input to the hash function, the second
physical memory address being associated with a memory
location at a second memory module coupled to the
reprogrammable circuit module.
806
```

```
Access, during a first time period, the first memory module
using the first physical memory address.
808
```

```
Access, at a second time period, the second memory module
using the second physical memory address.
810
```

FIG. 8

METHODS AND APPARATUS FOR DATA ACCESS BY A REPROGRAMMABLE CIRCUIT MODULE

CROSS-REFERENCE TO RELATED APPLICATION

This application is a continuation of PCT Patent Application No. PCT/US12/42143, filed on Jun. 13, 2012, titled "Methods and Apparatus for Data Access by a Reprogrammable Circuit Module," which is incorporated herein by reference in its entirety. This application is also a continuation-in-part of U.S. patent application Ser. No. 13/161,141, filed on Jun. 15, 2011, titled "Methods and Apparatus for Data Access by a Reprogrammable Circuit Module," which is incorporated herein by reference in its entirety.

BACKGROUND

Some embodiments described herein relate generally to memory systems, and, in particular, to systems and methods for accessing data from a memory system using a reprogrammable circuit module.

Some known systems for performing database searches employ an array of individual computers each programmed to perform a similar search function on one or more databases, in order to increase the speed of retrieving data from the databases. Such a scheme, however, is difficult to manage and coordinate different computers. Some other known systems use an array of disk drives connected to an array of processor units. To perform a search function, data is read from the disk drives and processed at the processor units. With this approach, large amount of data is transmitted from the disk drives to the processors, which causes a substantial latency in retrieving data.

Accordingly, a need exists for a system where high speed database searches can be performed, and particularly, improvement in speed over the existing design using disk drives can be achieved.

SUMMARY

In some embodiments, an apparatus includes a set of memory modules configured to store data and a reprogrammable circuit module operatively coupled to the set of memory modules. The reprogrammable circuit module is configured to receive, from a host device, information associated with a search request. The reprogrammable circuit module is configured to change from a first configuration to a second configuration in response to receiving the information. The reprogrammable circuit module is configured to retrieve at least a portion of the data stored at the set of memory modules associated with the second configuration. The reprogrammable circuit module is configured to generate a search result based on the portion of the data, and transmit the search result to the host device.

BRIEF DESCRIPTION OF THE DRAWINGS

FIG. 5 is a flow chart illustrating a method for executing a search process on multiple memory modules, according to an embodiment.

FIG. 8 is a flow chart illustrating a method for accessing memory modules based on data items, according to an embodiment.

DETAILED DESCRIPTION

Figure 1:
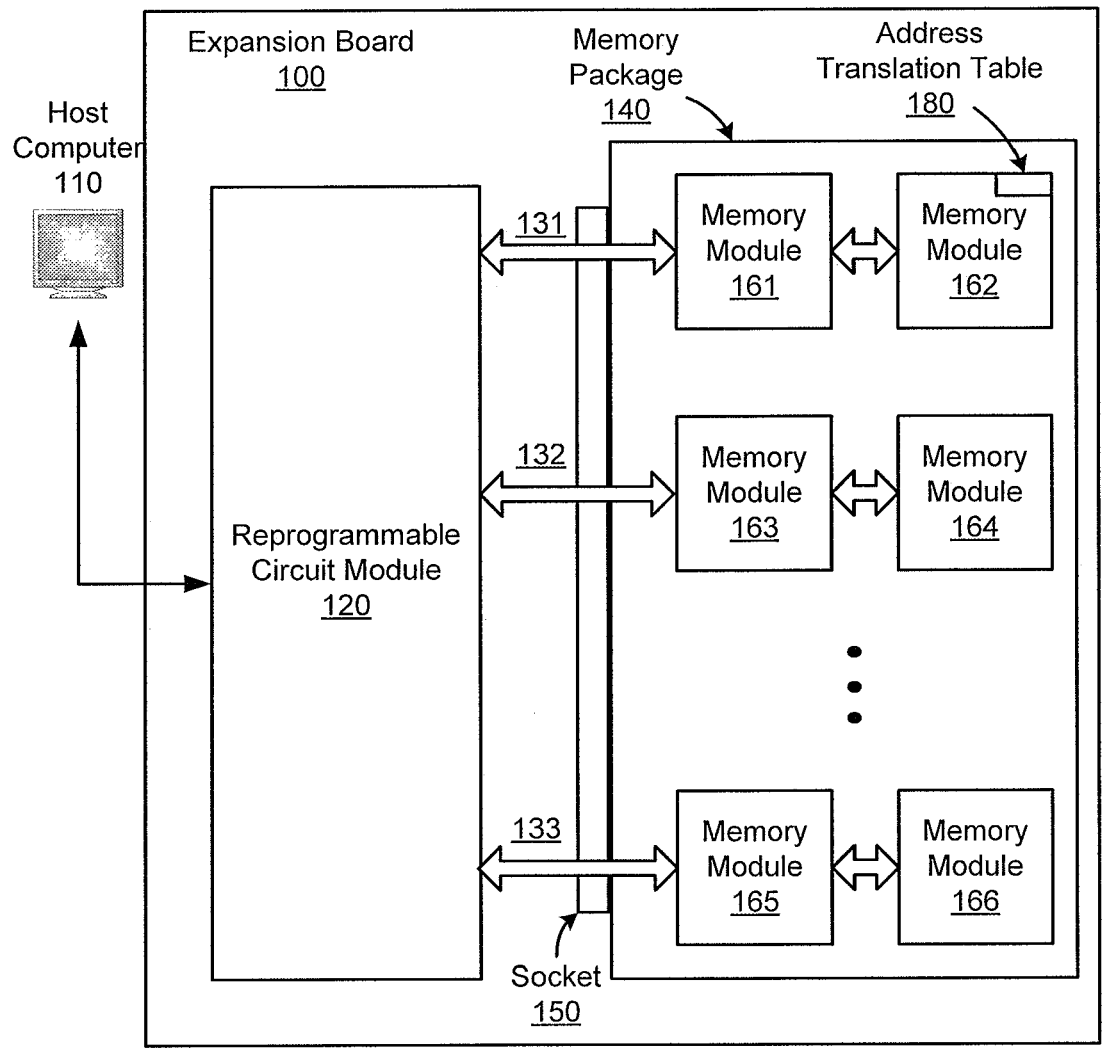
FIG. 1 is a system block diagram of a reprogrammable circuit module coupled to a set of memory modules, according to an embodiment.

In some embodiments, an apparatus includes a set of memory modules, a reprogrammable circuit module and a set of data channels. Each memory module from the set of memory modules is associated with an address translation table configured to store a set of address pairs, where each address pair includes (1) a physical memory address associated with a physical location in a memory module from the set of memory modules and (2) a logical memory address associated with the physical memory address. The reprogrammable circuit module is configured to execute a search process based at least in part on data stored at the set of memory modules. The search process is configured to retrieve a first physical memory address associated with a first logical memory address from an address translation table associated with a first memory module from the set of memory modules, and a second physical memory address associated with a second logical memory address from an address translation table associated with a second memory module from the set of memory modules. In some embodiments, the reprogrammable circuit module is configured to randomly associate the first physical memory address with the first logical memory address and randomly associate the second physical memory address with the second logical memory address, such that the first logical memory address is adjacent to the second logical memory address while the first physical memory address is not adjacent to the second physical memory address. In some embodiments, the reprogrammable circuit module can be configured to randomly associate physical memory addresses with logical memory addresses, such that the physical memory addresses associated with a set of sequential logical memory addresses are substantially uniformly distributed within a range of physical memory addresses (e.g., across the entire available memory space of one or more memory modules).

Furthermore, each data channel from the set of data channels operably couples the reprogrammable circuit module to at least one memory module from the set of memory modules. The reprogrammable circuit module is configured to send, based on the search process, a first query to the first memory module via a first data channel from the set of data channels based on the first physical memory address and a second query to the second memory module via a second data channel from the set of data channels based on the second memory address. In some embodiments, the reprogrammable circuit module is configured to send the first query at substantially a same time as the second query. In some embodiments, the reprogrammable circuit module is a Field Programmable Gate Array (FPGA), and configured to be modified by a driver module. In some embodiments, each memory module from the set of memory modules is a flash memory module included in a dual in-line memory module (DIMM), and the set of memory modules are removably coupled to a Peripheral Component Interconnect Express (PCIe) card including the reprogrammable circuit module.

In some embodiments, an apparatus comprises a first reprogrammable circuit module and a memory package including a set of memory modules. The memory package is removably coupled to the first reprogrammable circuit module. Specifically, the memory package is operatively coupled to the first reprogrammable circuit module via a set of channels when in a first configuration, and physically coupled to a second reprogrammable circuit module when in a second configuration. At least one memory module from the set of memory modules is configured to store an address translation table having a set of address pairs associated with the set of memory modules. Each address pair from the set of address pairs includes (1) a physical memory address associated with a physical location in the set of memory modules and (2) a logical memory address associated with the physical memory address. In some embodiments, the memory package is a DIMM, where each memory module from the set of memory modules is a flash memory module on the DIMM. In some embodiments, the first reprogrammable circuit module is an FPGA.

Furthermore, the first reprogrammable circuit module is configured to use the set of address pairs to execute a search process via the set of channels after the memory package is moved from the second configuration to the first configuration, where the search process is substantially the same as a search process executed by the second reprogrammable circuit module when the memory package is in the second configuration. The search process executed by the first reprogrammable circuit module is configured to retrieve a physical memory address associated with a received logical memory address using the address translation table. Furthermore, in some embodiments, the first reprogrammable circuit module is configured to send a first query to a first memory module from the set of memory modules during a first time period, and send a second query to a second memory module from the set of memory modules during a second time period overlapping the first time period.

In some embodiments, an apparatus includes a set of memory modules configured to store data and a reprogrammable circuit module operatively coupled to the set of memory modules. In some embodiments, each memory module from the set of memory modules is included in a DIMM. In some embodiments, each memory module from the set of memory modules is a flash memory module. In some embodiments, each memory module from the set of memory modules is removably coupled to a PCIe card including the reprogrammable circuit module. In some embodiments, the reprogrammable circuit module is an FPGA. In some embodiments, the reprogrammable circuit module is configured to be modified by a driver module.

The reprogrammable circuit module is configured to receive, from a host device, information associated with a search request. In some embodiments, the information is associated with a Structured Query Language (SQL) query. The reprogrammable circuit module is configured to change from a first configuration to a second configuration in response to receiving the information. The reprogrammable circuit module is configured to retrieve at least a portion of the data stored at the set of memory modules associated with the second configuration. In some embodiments, the reprogrammable circuit module is configured to compare the data stored in the set of memory modules with at least one search parameter, and retrieve the portion of the data based on the comparison. The reprogrammable circuit module is configured to generate a search result based on the portion of the data, and transmit the search result to the host device. In some embodiments, the search result is based on a function of the portion of the data, but does not include the portion of the data. In some other embodiments, the search result includes the portion of the data.

FIG. 1 is a system block diagram of a reprogrammable circuit module 120 coupled to a set of memory modules (e.g., memory modules 161-166), according to an embodiment. The reprogrammable circuit module 120 is a portion of an expansion board 100, which is operatively coupled to a host computer 110. The set of memory modules, including memory modules 161-166, are included in a replaceable memory package 140 that is coupled to the expansion board 100 via a socket 150. Furthermore, each memory module from the set of memory modules in the memory package 140 is operatively coupled to reprogrammable circuit module 120 via a data channel, such as data channels 131, 132 and 133 shown in FIG. 1.

As shown in FIG. 1 and further described below, the expansion board 100 contains an implementation of a scalable structure that is synthesized by connecting multiple parallel channels (e.g., data channels 131-133) of high data rate memory modules (e.g., memory modules 161-166) directly to a data-processing module (e.g., reprogrammable circuit module 120). In other words, an array of memory modules is connected to a single large data-processing module, where each memory module has its own data channel, thus to provide a combined transfer rate of up to a multiple times of the data rate for a single data channel. In some embodiments, such an integrated structure consisting of a single data-processing module connected to an array of memory modules (typically flash memory devices) is referred to as a Flash Processing Element (FPE). In some embodiments, a scalable implementation of a FPE is known as a Scalable Large Flash Memory (SLFM) system.

The expansion board 100 can be any removable device that can be used to implement a FPE structure, i.e., to access and retrieve data stored in the memory package 140, and locally process the retrieved data within the expansion board 100. Specifically, reprogrammable circuit module 120 can be used to access and retrieve data from the memory modules (e.g., memory modules 161-166) included in the memory package 140 via the data channels (e.g., data channels 131-133), and then process the retrieved data within the expansion board 100. For example, the expansion board 100 can be an add-in circuit board directly coupled to a motherboard of a PC. For another example, the expansion board 100 can be a removable module connected to a processor of a computer server via an interface and/or a bus. Furthermore, the expansion board 100 can be operatively coupled to a host computer 110 via for example, a high speed serial data and/or command interface over a data channel. In some embodiments, the expansion board 100 can be connected to a motherboard of the host computer 110.

In some embodiments, the expansion board 100 can be a PCIe card. In such embodiments, the FPE system including the reprogrammable circuit module 120, the memory package 140 and other components (not shown in FIG. 1) are contained on the PCIe expansion board 100. Physical implementation of the I/O channel connecting the expansion board 100 and the host computer 120 can be in a PCIe format, and the expansion board 100 can be accessible with a unique PCIe address. The PCIe format allows multiple FPE boards, including the expansion board 100, to be used in a variety of configurations from single board applications to systems needing hundreds of FPEs. These FPE boards (i.e., PCIe cards such as the expansion board 100) are physically compatible with common full length PCI slots of a PC or a PCIe expansion chassis. Furthermore, such a PCIe card can be connected to a motherboard or a host computer via a high speed serial data or command interface over a multi-lane PCIe channel, which can provide a large data rate (e.g. 5 G bytes/sec). Additionally, in some embodiments, the expansion board 100 can be a circuit board that adopts the Advanced Telecommunications Computing Architecture (ATCA) backplane interface specification or any other interface specification.

The reprogrammable circuit module 120 can be any circuit module that is capable of retrieving data from the memory package 140. In some embodiments, the reprogrammable circuit module 120 can be capable of on-board processing of retrieved data. In some embodiments, the reprogrammable circuit module 120 can be an FPGA. For example, the reprogrammable circuit module 120 can be an Altera Stratix 4GX-530 FPGA. More specifically, the reprogrammable circuit module 120 can be an FPGA consisting of a large number of logic elements and/or data-processing elements, which is programmed to retrieve data stored at memory modules in the memory package 140 and further process the retrieved data within the reprogrammable circuit module 120. In other embodiments, a reprogrammable circuit module can be an application-specific integrated circuit (ASIC) or any other suitable programmable logic device (PLD), such as a programmable logic array (PLA), a programmable array logic (PAL), a complex programmable logic device (CPLD), etc.

Particularly, the reprogrammable circuit module 120 can be used to perform a search function. That is, the reprogrammable circuit module 120 can be configured to search specific data (e.g., a string, a term) from the data stored within the memory modules included in the memory package 140. Details of a reprogrammable circuit module being configured to perform a search function are described with respect to FIGS. 4-5.

In some embodiments, the reprogrammable circuit module 120 includes an on-board configuration storage, such as an on-board configuration ROM (read-only memory), to store a configuration file. The configuration ROM, although not shown in FIG. 1, can be mounted on the expansion board 100 and electrically coupled to the reprogrammable circuit module 120. The configuration file contained in the configuration ROM can be automatically uploaded from the configuration ROM into the reprogrammable circuit module 120 upon the application of power at the beginning of a system boot-up. As a result, the reprogrammable circuit module 120 is configured to operate according to the uploaded configuration file, such as to perform a specific task (e.g., a search function). Furthermore, a new configuration file can be loaded into the on-board configuration ROM of the expansion board 100 at any time after a system boot-up, and further uploaded into the reprogrammable circuit module 120 (e.g., at next system boot-up), such that the reprogrammable circuit module 120 can be "reprogrammed" to perform a different task if necessary.

In some embodiments, the reprogrammable circuit module 120 can also be configured, or "reprogrammed", by a driver module (not shown in FIG. 1), which is typically located at the host computer 110. As a tool to configure the reprogrammable circuit module 120 from the host computer 110, the driver module can optimize a program (e.g., an FPGA program) for a given task that is to be executed by the reprogrammable circuit module 120, and then send the program to the reprogrammable circuit module 120. For example, as different search programs use different criteria, a user can write a VHDL (VHSIC hardware description language) program for a given search algorithm, and then send the VHDL program to the reprogrammable circuit module 120 from the host computer 110 using the driver module. As a result, the reprogrammable circuit module 120 can adjust accordingly and execute the search function according to the VHDL program. In other embodiments, other programming languages such as Verilog or other HDL languages can be used to reprogram or configure the reprogrammable circuit module 120. In some embodiments, the driver module can be configured to download the program to the reprogrammable circuit module 120 using, for example, an application programming interface (API) or any other suitable method.

In some embodiments, one or more driver modules can be used to configure (or reprogram) the reprogrammable circuit module 120 for various applications and/or tasks. For example, a driver module can configure the reprogrammable circuit module 120 to perform a search task using a first keyword. The same driver module can configure the reprogrammable circuit module 120 (at a different time) to perform another search task using a second keyword. For another example, a first driver module can configure the reprogrammable circuit module 120 to perform a search task; a second driver module can configured the reprogrammable circuit module 120 to perform a data-storing task.

As shown in FIG. 1, the memory package 140 contains multiple memory modules, such as the memory modules 161-166. A memory module in the memory package 140 can be any type of memory device that can be used to store data and can be accessed by the reprogrammable circuit module 120 via, for example, a data channel (e.g., data channel 131-133). In some embodiments, a memory module can include one or more memory blocks, each of which contains a certain memory space of a fixed block size (e.g., 16 kB, 32 kB, etc.). In some embodiments, a memory module can be a flash memory device, such as a multi-level cell (MLC) Not AND (NAND) chip, a single level cell (SLC) NAND chip, or a Clear NAND chip, etc. To support a particular type of memory device, the reprogrammable circuit module 120 can be adjusted accordingly. For example, an FPGA internal state machine providing readout of the memory devices can be changed according to the specific type of memory devices. In some embodiments, the memory modules in a single memory package (e.g., memory package 140) can be instances of a same type of memory devices.

In some embodiments, each memory module contained in the memory package 140 is associated with an address translation table, which is from a set of one or more address translation tables stored in one or more memory modules contained in the memory package 140. That is, at least one memory segment unit in each memory module is associated with an entry of an address translation table stored in a memory module. For example, as shown in FIG. 1, each memory module contained in the memory package 140 is associated with an address translation table 180, which is stored in the memory module 162. The address translation table 180 can be configured to store a set of address pairs. Each address pair can include a physical memory address associated with a physical location in a memory module contained in the memory package 140, and a logical memory address associated with that physical memory address. Details of the internal structure of a memory module and an address translation table are further described with respect to FIGS. 2-3.

In some embodiments, although not shown in FIG. 1, more than one address translation table can be stored in the memory modules in the memory package 140. In such embodiments, for example, each memory module contained in the memory package 140 can be associated with a single address translation table. For example, each memory module (e.g., memory module 161-166) contained in the memory package 140 can have its own address translation table, which is stored in the associated memory module. In that case, the address translation table 180 is uniquely associated with the memory module 162. Similarly stated, the address translation table 180 is configured to store mapping information for memory segment units of the memory module 162 but not the other memory modules including the memory modules 161, 163-166, etc.

The memory package 140 can be any replaceable module that can contain one or more memory modules (e.g., the memory modules 161-166) and enable the memory modules to be accessed by an on-board data-processing module (e.g., the reprogrammable circuit module 120) via for example, one or more data channels (e.g., the data channels 131-133). The memory package 140 is replaceable in the sense that it can be mounted onto any suitable circuit board via a suitable interface socket, or removed from the circuit board if necessary. For example, the memory package 140 can be mounted onto the expansion board 100 via a socket 150 when in a first configuration as shown in FIG. 1, or mounted onto another circuit board via another suitable interface socket (not shown in FIG. 1) when in a second configuration. As a result, the memory package can be physically coupled to the reprogrammable circuit module 120 via a set of data channels (e.g., the data channels 131-133) when in the first configuration, and physically coupled to another reprogrammable circuit module via a different set of data channels when in the second configuration.

Accordingly, the memory modules (e.g., the memory modules 161-166) can be removed from the expansion board 100 containing the on-board data-processing module (e.g., the reprogrammable circuit module 120) and other associated interface components (not shown in FIG. 1). The expansion board 100 can be used as a "carrier" board for one or more memory packages that include one or more memory modules. Each of the memory packages can be structurally and functionally similar to the memory package 140 described herein. As a result, the memory modules accessed by the reprogrammable circuit module 120 can be easily replaced with for example, new types of memory modules, or same type of memory modules containing different data. Specifically, a memory package containing the old types of memory modules can be removed from an expansion board, and then a different memory package containing the new types of memory modules can be mounted onto the expansion board. Thus, this feature permits upgrading the memory modules to newer types as they become available, which greatly enhances the technology lifetime of the system. Furthermore, the memory capacity of an expansion board can be expanded by mounting additional memory packages onto the expansion board. In some embodiments, operations on a memory package associated with an expansion board (e.g., remove the memory package from the expansion board, replace the memory package with another memory package, mount the memory package onto the expansion board) do not erase, change or affect in any other means the data stored in the other memory packages mounted on the expansion board.

Figure 4:
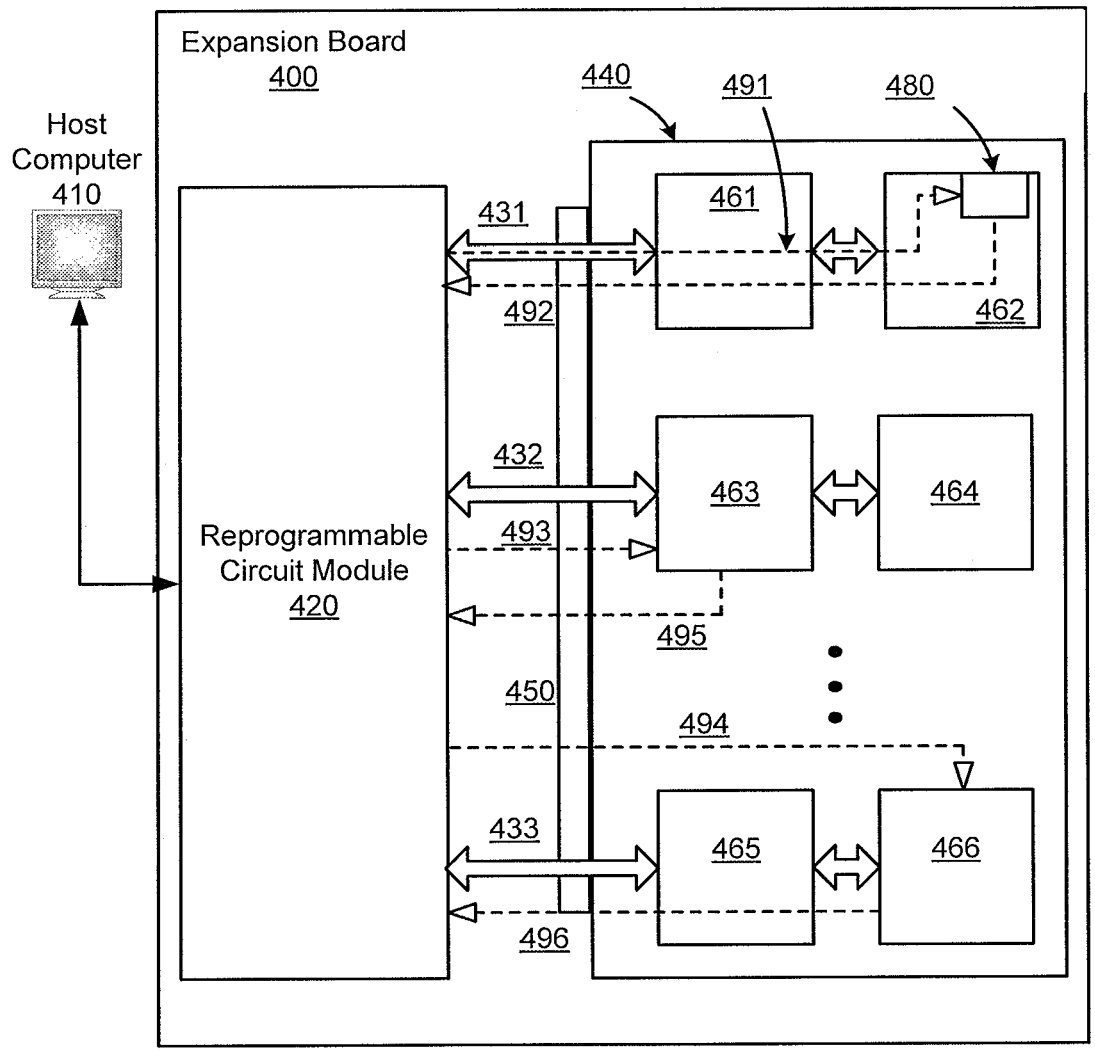
FIG. 4 is a schematic illustration of a reprogrammable circuit module configured to execute a search process, according to an embodiment.

On the other hand, as described in detail with respect to FIGS. 4-5, the reprogrammable circuit module 120 can be configured to execute a task such as a search function on the memory package 140 when the memory package 140 is coupled to the reprogrammable circuit module 120 in the first configuration, where the search function is substantially the same as a search function executed by a different reprogrammable circuit module when the memory package is coupled to the different reprogrammable circuit module in the second configuration.

In some embodiments, the reprogrammable circuit module 120 can be configured to obtain and maintain a status of the memory modules contained in the memory package(s) (e.g., the memory package 140) that are operatively coupled to and accessed by the reprogrammable circuit module 120. The reprogrammable circuit module 120 can be configured to execute code (e.g., FPGA code) to collect a status (e.g., operative or inoperative) and/or other information (e.g., available memory space) associated with each memory module from that memory module. Based on the collected information, the reprogrammable circuit module 120 can determine, for example, the memory modules that are active in operation, the total memory space that is available from the operative memory modules, and/or the like. In some embodiments, as further described with respect to FIG. 7, the reprogrammable circuit module 120 can obtain information associated with usage on a memory block such as, for example, a number of access operations associated with that memory block.

In some embodiments, the memory package 140 can be a DIMM. In such embodiments, the SLFM design using a DIMM as a memory package can be compatible with a variety of flash memory devices as memory modules, including MLC NAND chips, SLC NAND chips, Clear NAND chips, etc. Also, a DIMM flash mounting scheme uses DIMM slot connectors to mount the flash memory devices (e.g., memory modules 161-166) onto the memory package 140, which is then coupled to the expansion board via socket 150. For example, the memory package 140 can be a DIMM with a memory of 1 T bytes that contains 16 Clear NAND chips, each of which has a memory of 64 G bytes. Additionally, the use of the DIMM flash mounting scheme also permits alternative types of flash memory devices to be used on the memory package 140 without re-spinning the expansion board 100, by only providing a new DIMM containing the new type of flash memory devices, and adjusting the reprogrammable circuit module 120 accordingly (e.g., changing the FPGA code consistent with the state machine requirements of the new part in the reprogrammable circuit module 120).

As shown in FIG. 1, a set of data channels (e.g., the data channels 131-133) operatively couple the reprogrammable circuit module 120 to the memory modules (e.g., the memory modules 161-166) contained in the memory package 140. A data channel can be used to convey any data, command, query or the like from the reprogrammable circuit module 120 to a memory module, and/or send any retrieved data or information from the corresponding memory module to the reprogrammable circuit module 120. Furthermore, the data channels are parallel to each other, in the sense that multiple data channels can be used at the same time to transmit data between the reprogrammable circuit module 120 and various memory modules of the memory package 140. For example, if there are 34 data channels connecting the memory modules and the reprogrammable circuit module 120, each having a speed of 200M byte/sec (e.g., using a double data rate (DDR) sync protocol), then an aggregate rate up to 6 G byte/sec can be provided.

In some embodiments, more than one memory module can be connected to the reprogrammable circuit module 120 by a single data channel. For example, as shown in FIG. 1, the memory modules 161, 162 are connected to the reprogrammable circuit module 120 via the data channel 131; the memory modules 163, 164 are connected to the reprogrammable circuit module 120 via the data channel 132; the memory modules 165, 166 are connected to the reprogrammable circuit module 120 via the data channel 133. Specifically, more than one memory module per data channel is made possible by exploiting the latency time of accessing a unit (e.g., a page) of data from a memory module, to interleave data accesses to multiple memory modules on the same data channel. For example, in the case of Clear NAND chips, the latency time is 150 μsec. Since the page readout time is about 50 μsec, it is possible to combine two chips on a single memory bus (i.e., data channel) with no loss of latency. Thus, the latency time between the receipt of a command selecting a page to be transferred and the beginning of transmission is exploited to permit having multiple flash memory devices sharing a single data channel.

Furthermore, the number of memory modules (e.g., flash memory devices) that can be supported by the reprogrammable circuit module 120 (e.g., an FPGA) can be limited by the I/O pin count of the reprogrammable circuit module 120, as well as the internal logic resources of the reprogrammable circuit module 120 needed to support the memory modules. The internal resources include for example, logic support for generating the state machine timing signals needed to meet the flash interface requirements, data buffers needed for alignment and error correction of the transferred pages, etc. For example, a Stratix EP4S530 FPGA has 744 I/O pins, allowing for various I/O interface standards needed by the FPGA to connect flashing memory devices and other components. As a result, a Stratix EP4S530 FPGA can support as many as 33 flash memory chips (e.g., contained in one or more memory packages).

Figures 2, 3:
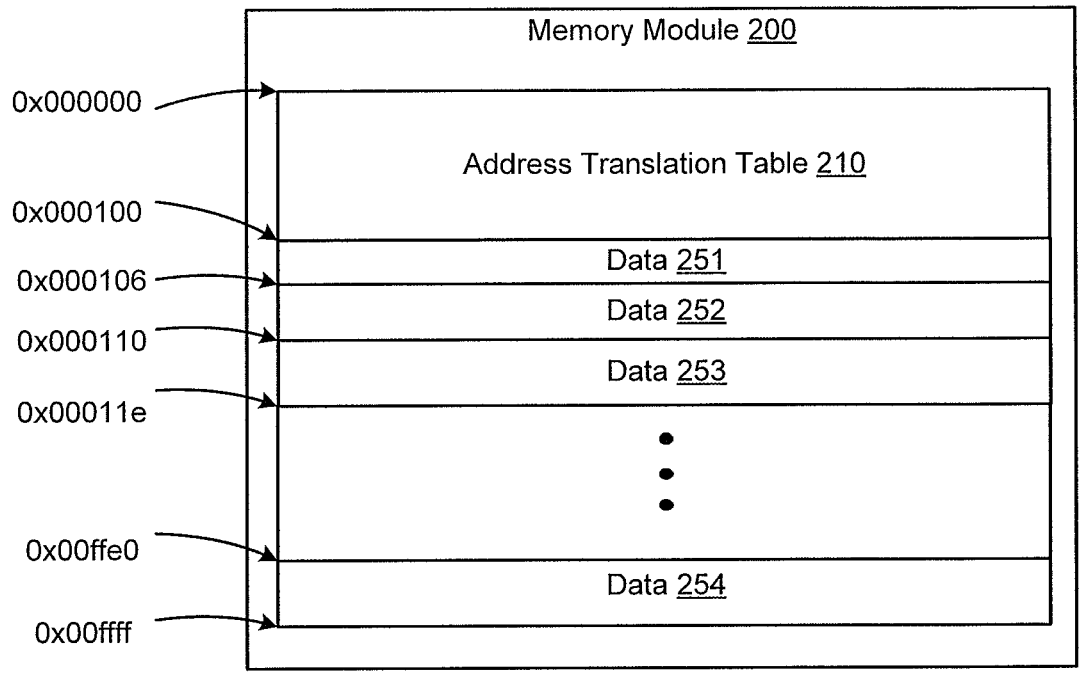
FIG. 2 is a schematic illustration of structure of a memory module, according to an embodiment.
FIG. 3 is a schematic illustration of an address translation table stored in a memory module, according to an embodiment.

FIG. 2 is a schematic illustration of structure of a memory module 200, according to an embodiment. The memory module 200 can be structurally and functionally similar to the memory modules 161-166 shown and described in FIG. 1. As shown in FIG. 2, the memory module 200 stores an address translation table 210 and other data (e.g., data 251-254). Specifically, data is stored in a number of memory segment units. For example, data 251-254 is stored in four separate memory segment units, respectively. In some embodiments, a memory segment unit can be for example, a page. In some embodiments, an address translation table can be stored in one memory segment unit (as the address translation table 210 shown in FIG. 2) or across multiple memory segment units. In some embodiments, a memory segment unit can correspond to one or more memory blocks in a memory module. In some other embodiments, a memory segment unit can correspond to a portion of a memory block in a memory module.

Each memory segment unit in the memory module 200 can be identified by, for example, a physical memory address representing a physical location of the starting point of that memory segment unit. A physical memory address can be for example, a binary number from a finite monotonically ordered sequence of binary numbers that uniquely describes the physical location of a memory itself. For example, as shown in FIG. 2, the memory segment unit where the address translation table 210 is stored can be identified by a physical memory address 0x000000, which represents a physical location of the starting point of that memory segment unit. In this case it is also the starting point of the memory space of memory module 200. For another example, the memory segment unit where data 251 is stored can be identified by a physical memory address 0x000100, which represents a physical location of the starting point of that memory segment unit. Furthermore, as shown in FIG. 2, the physical memory addresses of the memory segment units form a monotonically-ordered (e.g., increasing, decreasing) sequence.

In some embodiments, a memory segment unit of the memory module 200 can be accessed by for example, a reprogrammable circuit module (e.g., the reprogrammable circuit module 120 in FIG. 1), based on the physical memory address identifying the memory segment unit. In some embodiments, a reprogrammable circuit module can be configured to search or retrieve the data stored in a memory segment unit of the memory module 200 using the physical memory address identifying that memory segment unit to locate a starting point for the search or retrieving operation. For example, a reprogrammable circuit module can be configured to retrieve data 252 using physical memory address 0x000106 to locate a starting point for the retrieving operation. Particularly, a reprogrammable circuit module can be configured to search the address translation table 210 using 0x000000 to locate a starting point for the search.

FIG. 3 is a schematic illustration of an address translation table 300 stored in a memory module, according to an embodiment. The address translation table 300 can be structurally and functionally similar to the address translation table 180 or the address translation table 210 shown in FIGS. 1-2, and accordingly, the memory module hosting the address translation table 300 can be structurally and functionally similar to the memory module 162 or the memory module 200 shown in FIGS. 1-2. In some embodiments, an address translation table can be referred to as a block-address translation (BAT) table.

As shown in FIG. 3, the address translation table 300 has two columns of entries, shown as a logical memory address 310 and a physical memory address 320. The first column, the logical memory address 310, contains logical memory addresses (e.g., 1000, 1001, 1002, 1100), each of which uniquely identifies a logical memory address associated with a memory segment unit in a memory package including the memory module that hosts the address translation table 300. A logical memory address can be in any suitable form and can represent a location, at which a memory segment unit (or other item such as a memory cell, a storage element, etc.) appears to reside from the perspective of a reprogrammable circuit module that performs a search function on the memory modules. In the example of FIG. 3, a logical memory address can be a four-digital integer, such as 1000, 1001, etc. In other embodiments a logical memory address can be in any other suitable form.

The second column, the physical memory address 320, contains physical memory addresses (e.g., 465/0x002010, 463/0x006a24, 466/0x00f92a, 461/0x00ff00), each of which uniquely identifies a physical memory location of a memory segment unit in the memory package. In some embodiments, an address translation table stored in a memory module can store physical memory addresses identifying physical memory locations within other memory modules. In such embodiments, a physical memory address stored in this address translation table can include both information associated with a hosting memory module and information identifying a physical memory location within that hosting memory module. In the example of the physical memory address "465/002010" shown in FIG. 3, "465" identifies a memory module (i.e., the memory module 465 shown in FIG. 1) and "002010" identifies a memory segment unit, which is represented by a physical memory address "0x002010", in the identified memory module 465. Overall, the physical memory address "465/002010" identifies the memory segment unit "0x002010" in the memory module 465. Similarly, the physical memory address "463/ 006a24" identifies the memory segment unit "0x006a24" in the memory module 463.

The address translation table 300 associates each logical memory address with a physical memory address. Specifically, each logical memory address stored in the column of the logical memory address 310 can be mapped to a physical memory address stored in the column of the physical memory address 320. For example, the logical memory address "1000" is mapped to the physical memory address "465/ 0x002010" in the first entry of the address translation table 300. For another example, the logical memory address "1001" is mapped to the physical memory address "463/ 0x006a24" in the second entry of the address translation table 300.

In some embodiments, the logical memory addresses can be stored in a logical order in the address translation table 300, such as a monotonically-increasing order as shown in FIG. 3. In such embodiments, the physical memory addresses are not necessarily stored in any logical order in the address translation table 300. For example, the logical memory address stored in the first entry of the address translation table 300 (i.e., 1000) is adjacent to the logical memory address stored in the second entry of the address translation table 300 (i.e., 1001), while the physical memory address stored in the first entry (i.e., 465/0x002010), is not adjacent to the physical memory address stored in the second entry (i.e., 463/ 0x006a24). In fact, the two physical memory addresses identify two memory segment units in two different memory modules. In other embodiments, physical memory addresses can be stored in a logical order in the address translation table 300.

In some embodiments, a reprogrammable circuit module can be configured to associate a physical memory address with a logical memory address stored in an address translation table. That is, the reprogrammable circuit module can be configured to assign a physical memory address to each logical memory address, and then store the pair of addresses (i.e., the physical memory address and the logical memory address) as an entry in the address translation table. Furthermore, in some embodiments, the reprogrammable circuit module can be configured to randomly assign a physical memory address to a logical memory address, such that the logical memory addresses are stored in a logical order in the address translation table, while the physical memory addresses associated with those logical memory addresses are randomly distributed across the entire available memory space provided by the memory modules, as shown in FIG. 3. In some embodiments, for example, the physical memory addresses associated with those logical memory addresses can be substantially uniformly distributed across the entire available memory space provided by the memory modules.

In some embodiments, when a first memory segment unit (e.g., one or more memory blocks) changes from operative to inoperative, the reprogrammable circuit module can be configured to move data stored in the first memory segment unit to a second memory segment unit that is operative. Accordingly, the reprogrammable circuit module can be configured to update the address translation table such that a logical memory address associated with the data is remapped to a physical memory address associated with the second memory segment unit. Thus, the data can still be located by looking up the address translation table using the logical memory address associated with the data.

In some embodiments, a SLFM system described with respect to FIG. 1 can be used to execute a search function. FIG. 4 is a schematic illustration of such a SLFM system, including a reprogrammable circuit module 420 that is configured to execute a search process on a memory package 440, according to an embodiment. The structure of the system in FIG. 4 is similar to that of the system shown in FIG. 1. Specifically, the reprogrammable circuit module 420 is a portion of an expansion board 400, which is operatively coupled to a host computer 410. A set of memory modules, including memory modules 461-466, are included in a replaceable memory package 440 that is coupled to the expansion board 400 via a socket 450. Each memory module from the set of memory modules in the memory package 440 is operatively coupled to the reprogrammable circuit module 420 via a data channel, such as data channels 431-433.

A search process can be executed by the system shown in FIG. 4 as follows. Initially, a query is formulated in the host computer 410 by for example, an operator or a user of the host computer 410 and/or a program or application executing on the host computer 410. An application running on the host computer 410 can then be configured to translate the query into a set of machine executable tasks. In some embodiments, such a machine executable task can be for example, a string or a term of a predefined format (e.g., a fixed length) that can be searched against data stored in the memory modules on the memory package 440. Thus, the query is translated into a set of searchable strings or terms at the host computer 410.

In some embodiments, one or more logical memory addresses associated with a searchable string or term can be determined based on the string or term. Specifically, a logical memory address is associated with a string or term in a sense that data stored in the memory segment unit represented by the logical memory address is likely to contain information associated with the string or term. Thus, to search for the string or term, data stored in the memory segment unit represented by the logical memory address needs to be searched. In some embodiments, the desired logical memory addresses can be determined at the host computer 410, and then sent from the host computer 410 to the reprogrammable circuit module 420. In such embodiments, the reprogrammable circuit module 420 is configured to receive the logical memory addresses. In some other embodiments, the desired logical memory addresses can be determined at the reprogrammable circuit module 420 or another component of the system (not shown in FIG. 4). In such embodiments, the searchable string or term is sent from the host computer 410 to the reprogrammable circuit module 420 or the other component, where one or more logical memory addresses associated with the string or term are determined based on the string or term. The logical memory addresses are then sent to the reprogrammable circuit module 420 if necessary. As a result, one or more logical memory addresses associated with the searchable string or term are available at the reprogrammable circuit module 420. In the example of FIG. 4, the reprogrammable circuit module 420 is configured to receive logical memory address 1001 and 1002 (as shown in FIG. 3) from the host computer 410.

Next, the reprogrammable circuit module 420 can be configured to send an address-translation query including the desired logical memory addresses to an address translation table stored in a memory module in the memory package 440 via a data channel. As shown in FIG. 4, the reprogrammable circuit module 420 is configured to send an address-translation query, via the data channel 431 (shown as the data path 491), to the memory module 462 contained in the memory package 440, where an address translation table 480 is stored. Similar to the address translation table 180 shown in FIG. 1, the address translation table 480 is associated with the memory modules contained in the memory package 440. That is, at least one memory segment unit in each memory module contained in the memory package 440 is associated with an entry stored in the address translation table 480. In the example of FIG. 4, the address-translation query sent from the reprogrammable circuit module 420 to the memory module 462 includes the desired logical memory addresses 1001 and 1002.

In some embodiments, the reprogrammable circuit module 420 can be configured to send more than one address-translation queries, each of which contains a different set of logical memory addresses and is destined to a different address translation table. For example, although not shown in FIG. 4, if entries associated with the logical memory address 1001 and 1002 are stored in two different address translation tables in the memory package 440, then the reprogrammable circuit module 420 can be configured to send a first address-translation query containing the logical memory address 1001 to a first address translation table that includes an entry for the logical memory address 1001, and send a second address-translation query containing the logical memory address 1002 to a second address translation table that includes an entry for the logical memory address 1002. Thus, every logical memory address is carried by an address-translation query that is sent to an appropriate address translation table containing an entry for the logical memory address.

After an address-translation query containing a logical memory address is received at an address translation table, an entry associated with the logical memory address can be determined based on the logical memory address. A physical memory address associated with the logical memory address can be retrieved from the entry, and sent to the reprogrammable circuit module 420 via a data channel. In the example of FIG. 4, if the address translation table 480 includes the same entries of the address translation table 300 as shown in FIG. 3, then the physical memory address "463/0x006a24" is associated with the logical memory address 1001 and the physical memory address "466/0x00f92a" is associated with the logical memory address 1002. That is, the logical memory address 1001 points to a memory segment unit in the memory module 463, which is identified by a physical memory address of "0x006a24" in the memory module 463; and the logical memory address 1002 points to a memory segment unit in the memory module 466, which is identified by a physical memory address of "0x00f92a" in the memory module 466. As a result of the memory module 462 receiving the address-translation query containing the logical memory addresses 1001 and 1002, the physical memory addresses "463/0x006a24" and "466/0x00f92a" are retrieved from the address translation table 480 and sent to the reprogrammable circuit module 420 via the data channel 431 (shown as the data path 492 in FIG. 4). Thus, a desired logical memory address available at the reprogrammable circuit module 420 is used to retrieve a physical memory address, which can be used to locate a specific memory segment unit in a memory module within the memory package 440.

Subsequently, the reprogrammable circuit module 420 can be configured to send one or more data queries to one or more memory segment units, each of which is identified by a retrieved physical memory address associated with a logical memory address. Specifically, a data query destined to a memory segment unit in a memory module within the memory package 440 can be sent over a data channel connecting the reprogrammable circuit module 420 and the memory module. Furthermore, in some embodiments, multiple data queries to different memory modules can be sent from the reprogrammable circuit module 420 at substantially a same time. In other words, a first data query can be sent to a first memory module during a first time period, and a second data query can be sent to a second memory module during a second time period overlapping the first time period. Thus, sending multiple data queries or retrieving data from multiple memory modules can be performed in a substantially simultaneous fashion via multiple data channels.

In the example of FIG. 4, after the logical memory address 1001 and 1002 are translated into the physical memory address "463/0x006a24" and "466/0x00f92a", the reprogrammable circuit module 420 is configured to send a first data query to a memory segment unit identified by the physical memory address "0x006a24" in the memory module 463 via the data channel 432 (shown as the data path 493), and a second data query to a memory segment unit identified by the physical memory address "0x00f92a" in the memory module 466 via the data channel 433 (shown as the data path 494). The first data query and the second data query can be sent at substantially a same time, and subsequently, data can be retrieved from the memory module 463 and the memory module 466 during a substantially same time period (shown as the data path 495 and 496, respectively).

A data query sent from the reprogrammable circuit module 420 to a memory segment unit in a memory module is designed to retrieve data from the memory segment unit. In some embodiments, data stored in the memory segment unit can be retrieved completely and the original data can be sent to the reprogrammable circuit module 420 for further processing. In some other embodiments, data stored in the memory segment unit can be partially retrieved and sent to the reprogrammable circuit module 420 for further processing, according to the data query. Further processing can include for example, search the desired string or term in the original data or processed data. Such further processing can be performed at the reprogrammable circuit module 420, or alternatively, at another component of the host computer 410.

In some embodiments, information of the associations between logical memory addresses and physical memory addresses with respect to memory segment units contained in a memory package can be stored in one or more address translation tables included in the memory package. In other words, the remapping information (e.g., between the logical memory addresses and the physical memory addresses) for a memory package can be carried by the one or more address translation tables included in the memory package. As a result, the memory package can be swapped from one circuit board to another that is suitable for the memory package, without losing the remapping information. In the example of FIG. 4, the address translation table 480 is configured to store the remapping information for the memory package 440. Therefore, the memory package 440 can be removed from the expansion board 400 and coupled to a different circuit board, where a task (e.g., a search function) can be executed in a substantially same way by a different reprogrammable circuit module as when the memory package 440 is coupled to the expansion board 400.

FIG. 5 is a flow chart illustrating a method 500 for executing a search process on multiple memory modules, according to an embodiment. At 502, a query associated with a data lookup is received at a reprogrammable circuit module, where the query includes a first logical memory address and a second logical memory address. The data lookup can be part of a search process executed by the reprogrammable circuit module on a set of memory modules contained in a memory package. Specifically, the data lookup can be translated by for example, an application running on a host computer operatively coupled to the reprogrammable circuit module, into a set of queries including the received query. Each query contains one or more logical memory addresses used to retrieve a physical memory address, and/or some other associated information for the search process. The query including the first logical memory address and the second logical memory address is then sent from the host computer to the reprogrammable circuit module.

In the example shown and described with respect to FIG. 1, after a search process is initiated at the host computer 110, a data lookup is generated at the host computer 110. Subsequently, a query associated with the data lookup is generated by an application at the host computer 110, and then sent to the reprogrammable circuit module 120. The query includes a first logical memory address L1 and a second logical memory address L2. Furthermore, in some embodiments, the first logical memory address L1 and the second logical memory address L2 can be adjacent to each other in a logically-ordered sequence.

Additionally, in some embodiments, an instruction can be received at the reprogrammable circuit module from a driver module operatively coupled to the reprogrammable circuit module, such that the search process can be modified based on the instruction. Such a modification can be for example, to reconfigure the reprogrammable circuit module, to update the address for an address translation table (e.g., after a new memory package is coupled to the reprogrammable circuit module), etc. In the example of FIG. 1, after a new memory package is mounted onto the expansion board 100 and operatively coupled to the reprogrammable circuit module 120, a driver module at the host computer 110 can be configured to send an instruction to the reprogrammable circuit module 120, for example, to provide an address for a new address translation table associated with the new memory package.

At 504, a first physical memory address associated with the first logical memory address is retrieved by the reprogrammable circuit module, where the first physical memory address is associated with a memory location at a first memory module coupled to the reprogrammable circuit module by a first data channel. Specifically, the reprogrammable circuit module can be configured to send an address-translation query including the first logical memory address to a first address translation table that includes an entry for the first logical memory address. The first address translation table is stored in a memory module operatively coupled to the reprogrammable circuit module via a data channel. As a result, the first physical memory address, which is associated with the first logical memory address (i.e., the first logical memory address and the first physical memory address are stored as a pair in an entry of the first address translation table), can be retrieved from the first address translation table and sent to the reprogrammable circuit module via the data channel. The first physical memory address identifies a memory location, such as a memory segment unit, in a first memory module that is coupled to the reprogrammable circuit module by a first data channel.

In the example of FIG. 1, the reprogrammable circuit module 120 can be configured to send an address-translation query including the first logical memory address L1 to the address translation table 180 included in the memory module 162 via the data channel 131. As a result, a first physical memory address P1, which is associated with the first logical memory address L1 in an entry of the address translation table 180, can be retrieved from the address translation table 180 and sent back to the reprogrammable circuit module 120 via the data channel 131. The first physical memory address P1 identifies a memory segment unit in for example, the memory module 164, which is coupled to the reprogrammable circuit module 120 via the data channel 132.

At 506, a second physical memory address associated with the second logical memory address is retrieved by the reprogrammable circuit module, where the second physical memory address is associated with a memory location at a second memory module coupled to the reprogrammable circuit module by a second data channel. Similarly to retrieving the first physical memory address, the reprogrammable circuit module can be configured to send an address-translation query including the second logical memory address to a second address translation table that includes an entry for the second logical memory address. In some embodiments, the second address translation table can be the same as the first address translation table, and thus the second logical memory address can be included in the same address-translation query for the first logical memory address. In some other embodiments, the entry for the second logical memory address is stored in a different address-translation table from that for the first logical memory address, and therefore, a separate address-translation query including the second logical memory address is sent to the second address-translation table, which is probably stored in a different memory module from that for the first address-translation table. As a result, the second physical memory address, which is associated with the second logical memory address (i.e., the second logical memory address and the second physical memory address are stored as a pair in an entry of the second address translation table), can be retrieved from the second address translation table and sent to the reprogrammable circuit module via the data channel. Similar to the first physical memory address, the second physical memory address identifies a memory location, such as a memory segment unit, in a second memory module that is coupled to the reprogrammable circuit module by a second data channel. In some embodiments, the second memory module can be different than the first memory module. In some embodiments, both the first memory module and the second memory module can be included within a common memory package, such as a common DIMM.

In the example of FIG. 1, the reprogrammable circuit module 120 can be configured to send an address-translation query including both the first logical memory address L1 and the second logical memory address L2 to the address translation table 180 included in the memory module 162 via the data channel 131. Alternatively, the reprogrammable circuit module 120 can be configured to send a different address-translation query including the second logical memory address L2 to a different address translation table (not shown in FIG. 1) included in a different memory module. As a result, in either case, a second physical memory address P2, which is associated with the second logical memory address L2, can be retrieved from the corresponding address translation table and sent to the reprogrammable circuit module 120 via a data channel. The second physical memory address P2 identifies a memory segment unit in, for example, the memory module 165, which is coupled to the reprogrammable circuit module 120 via the data channel 133. Furthermore, in the example of FIG. 1, both the memory module 164 including a location associated with the first physical memory address P1 and the memory module 165 including a location associated with the second physical memory address P2 are included in a common memory package 140, which can be for example, a DIMM.

At 508, the first memory module is accessed, during a first time period, by the reprogrammable circuit module via the first data channel using the first physical memory address. Specifically, based on the first physical memory address retrieved from the address translation table, the reprogrammable circuit module can be configured to locate and access the memory segment unit identified by the first physical memory address, which is included in the first memory module. Particularly, the reprogrammable circuit module can be configured to send a data query to the memory segment unit identified by the first physical memory address via the first data channel. As a result, data can be retrieved, during the first time period, from the memory segment unit identified by the first physical memory address.

In the example of FIG. 1, the reprogrammable circuit module 120 can be configured to send a data query to the memory segment unit identified by the first physical memory address P1, which is included in the memory module 164, via the data channel 132. As a result, data can be retrieved, during a first time period, from the memory segment unit identified by the first physical memory address P1 in the memory module 164, via the data channel 132.

At 510, the second memory module is accessed, during a second time period overlapping the first time period, by the reprogrammable circuit module via the second data channel using the second physical memory address. Similar to the case for the first physical memory address, the reprogrammable circuit module can be configured to send a data query to the memory segment unit identified by the second physical memory address, which is included in the second memory module, via the second data channel. As a result, data can be retrieved, during the second time period, from the memory segment unit identified by the second physical memory address. Furthermore, because the first memory module and the second memory module are two different memory modules, and the first data channel and the second data channel are two separate data channels, the operation of retrieving data from the first memory module and the operation of retrieving data from the second memory module are independent, therefore can be executed in parallel. Thus, the first time period can be overlapping the second time period.

In the example of FIG. 1, the reprogrammable circuit module 120 can be configured to send a data query to the memory segment unit identified by the second physical memory address P2, which is included in the memory module 165, via the data channel 133. As a result, data can be retrieved, during a second time period, from the memory segment unit identified by the second physical memory address P2 in the memory module 165, via the data channel 133. Furthermore, the first time period and the second time period can be overlapping.

Figure 6:
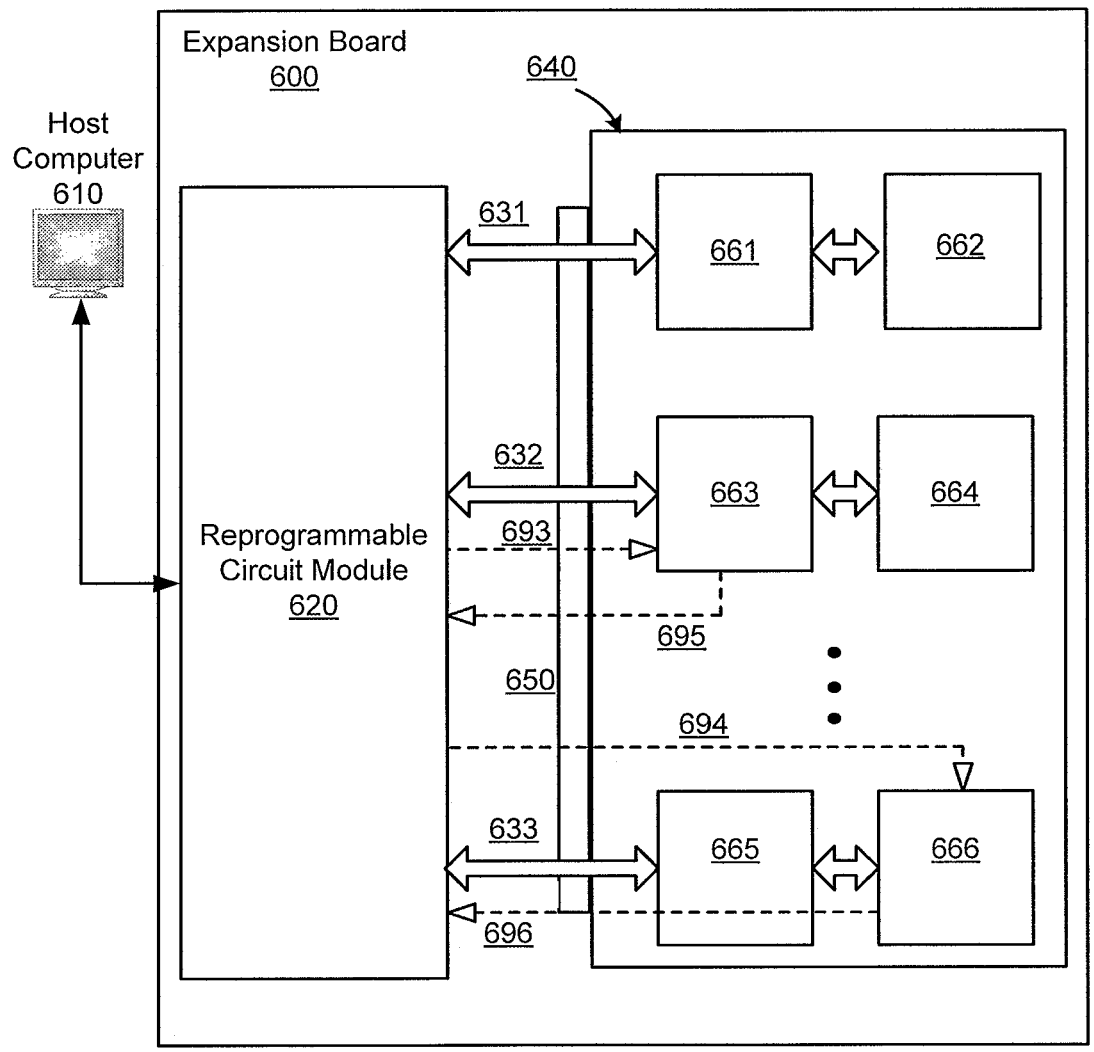
FIG. 6 is a schematic illustration of a reprogrammable circuit module configured to execute a search process on data stored in memory modules, according to an embodiment.

FIG. 6 is a schematic illustration of a reprogrammable circuit module 620 configured to execute a search process on data stored in memory modules (e.g., memory modules 661-666), according to an embodiment. The system in FIG. 6 can be structurally and functionally similar to the system shown and described with respect to FIGS. 1 and 4. Specifically, the reprogrammable circuit module 620 can be a portion of an expansion board 600, which is operatively coupled to a host computer 610. A set of memory modules, including memory modules 661-666, are included in a replaceable memory package 640 that is coupled to the expansion board 600 via a socket 650. Each memory module from the set of memory modules 661-666 in the memory package 640 is operatively coupled to the reprogrammable circuit module 620 via a data channel, such as data channels 631-633. Data can be stored in the set of memory modules 661-666 included in the memory package 640, and retrieved from the set of memory modules 661-666 to the reprogrammable circuit module 620 via the data channels (e.g., the data channels 631-633).

Similar to the memory package 140 and the memory package 440 in FIGS. 1 and 4, the memory package 640 can be, for example, a DIMM. Each memory module included in the memory package 640 can be, for example, a flash memory module. Similar to the expansion board 100 and the expansion board 400 in FIGS. 1 and 4, the expansion board 600 can be, for example, a PCIe card. Similar to the reprogrammable circuit module 120 and the reprogrammable circuit module 420 in FIGS. 1 and 4, the reprogrammable circuit module 620 can be, for example, an FPGA. Furthermore, the reprogrammable circuit module 620 can be reprogrammed (or reconfigured, modified) by, for example, a driver module (not shown in FIG. 6) operatively coupled to the reprogrammable circuit module 620. In some embodiments, such a driver module can be located at the host computer 610. In some embodiments, such a driver module can be configured to reprogram the programmable logic components, such as logic gates, of the reprogrammable circuit module 620. In some embodiments, such a driver module can be configured to change values of the registers included in the reprogrammable circuit module 620. In some embodiments, the reprogrammable circuit module 620 can be reprogrammed at run time. That is, the reprogrammable circuit module 620 can be reconfigured during the execution of a task (e.g., a search process).

The system in FIG. 6 can be configured to execute a search process. Initially, the reprogrammable circuit module 620 can be configured to receive information associated with a search request from the host computer 610. Such a search request can be in the form of, for example, a SQL query, or any other type of programming language designed for managing, searching and/or querying data. In some embodiments, the received information associated with the search request can include, for example, a search term, a string, a keyword, and/or the like. The received information associated with the search request can be used to configure the reprogrammable circuit module 620.

In response to receiving the information associated with the search request, the reprogrammable circuit module 620 can be reprogrammed. Specifically, the reprogrammable circuit module 620 can be configured to change from a first configuration to a second configuration, such that the reprogrammable circuit module 620 is programmed to execute the search process for the search request. For example, the reprogrammable circuit module 620 can be configured to change from a first configuration that is associated with storing data into the memory modules contained in the memory package 640, to a second configuration that is associated with executing the search process for the search request. In some embodiments, as a result of the reprogrammable circuit module 620 being changed from a first configuration to a second configuration, the values of the registers included in the reprogrammable circuit module 620 can be changed accordingly.

When in the second configuration, the reprogrammable circuit module 620 can be configured to search the data stored in the memory modules 661-666 contained in the memory package 640, and retrieve at least a portion of data from the memory modules 661-666. In some embodiments, the reprogrammable circuit module 620 can be configured to send one or more signals containing a search parameter to one or more of the memory modules 661-666. The search parameter can be, for example, a term, a string or a keyword that is associated with the search request. The reprogrammable circuit module 620 can be configured to compare the data stored in the memory modules 661-666 with the search parameter to identify data that is related to the search parameter. The reprogrammable circuit module 620 can then be configured to retrieve the identified data from the associated memory module(s) 661-666.

For example, the reprogrammable circuit module 620 can be configured to send a signal 693 containing a keyword to the memory module 663 via the data channel 632. The reprogrammable circuit module 620 is configured to compare the data stored in the memory module 663 with the keyword to identify any memory segment unit (e.g., a page) that stores the keyword. As a result, the reprogrammable circuit module 620 is configured to retrieve the data stored in the identified memory segment unit(s) from the memory module 663 via the data channel 632, shown as the signal 695 in FIG. 6. For another example, the reprogrammable circuit module 620 is configured to send a signal 694 containing a search term to the memory module 666 via the data channel 633. The reprogrammable circuit module 620 is configured to compare the data stored in the memory module 666 with the search term to identify a memory block that stores the search term. As a result, the reprogrammable circuit module 620 is configured to retrieve the data stored in the identified memory block(s) from the memory module 666 via the data channel 633, shown as the signal 696 in FIG. 6.

In some embodiments, the reprogrammable circuit module 620 can be configured to search the data stored in the memory modules contained in the memory package 640 using any other suitable method. For example, the reprogrammable circuit module 620 can be configured to retrieve the data stored in a memory module to the reprogrammable circuit module 620 (e.g., via a data channel), and store the data in a memory (e.g., a cache, a buffer) within the reprogrammable circuit module 620. The reprogrammable circuit module 620 can be configured to compare the retrieved data with a search parameter to identify the data that is related to the search parameter. Based on the comparison result, the reprogrammable circuit module 620 can be configured to remove the data that is not related to the search parameter from the memory. Thus, the data related to the search parameter is available at the reprogrammable circuit module 620 for further processing.

After the data identified as related to the search request is made available at the reprogrammable circuit module 620, the reprogrammable circuit module 620 can be configured to generate a search result based on the data. In some embodiments, the search result can include the identified data. For example, the search result can include a paragraph including a search term from an article stored in the memory modules 661-666 of the memory package 640. In some other embodiments, the search result can be generated based on, for example, a function of the retrieved data. Such a function can be, for example, a logical operation (e.g., a logical "and" operation, a logical "or" operation, etc.), a mathematical operation (e.g., a counting operation, an addition operation, etc.), or any other suitable function operated on the retrieved data. For example, the search result can include a number of times a keyword occurs in a database stored in the memory modules 661-666 of the memory package 640. For another example, the search result can be a binary value indicating whether a search term is stored in the memory modules 661-666 of the memory package 640 (e.g., the resulted search result is 1) or not (e.g., the resulted search result is 0).

After the search result is generated at the reprogrammable circuit module 620, the reprogrammable circuit module 620 can be configured to transmit the search result to the host computer 610. In such a search process, as described herein, data stored in the memory modules 661-666 of the memory package 640 is searched and processed (e.g., compared) at the memory package 640 or at the reprogrammable circuit module 620. Furthermore, the search result is generated at the reprogrammable circuit module 620. As a result, data searching and data processing associated with the search process are conducted within the expansion board 600, not at any software module (stored and/or executing in hardware) or at the host computer 610.

As an example, the reprogrammable circuit module 620 receives information associated with a search request from the host computer 610. The search request requests a number of times that a keyword occurs in a document stored in the memory modules 661-666 of the memory package 640, as well as each sentence from the document that includes the keyword. In response to receiving the information associated with the search request, the reprogrammable circuit module 620 is configured to change from a first configuration to a second configuration, such that the reprogrammable circuit module 620 is programmed to execute an appropriate search process associated with the search request. The reprogrammable circuit module 620 is configured send a set of signals to the memory modules 661-666 to search the data stored in the memory modules 661-666. Specifically, the reprogrammable circuit module 620 is configured to identify any sentence from the document stored in the memory modules 661-666 that includes the keyword, and retrieve data (e.g., text content) associated with the identified sentence(s). After data associated with each identified sentence that includes the keyword is made available at the reprogrammable circuit module 620, the reprogrammable circuit module 620 is configured to process the data and then generate a search report based on the data. Specifically, the reprogrammable circuit module 620 is configured to count the number of times that the keyword occurs in the identified sentences based on the retrieved data. Such a number is included in the search result. Additionally, each identified sentence is also included in the search result. After the search result is generated at the reprogrammable circuit module 620, the reprogrammable circuit module 620 is configured to transmit the search result to the host computer 610.

In some embodiments, the reprogrammable circuit module 620 can be reconfigured to execute different search processes for various search requests. For example, the reprogrammable circuit module 620 can be configured to receive information associated with a second search request that is different from the previous search request described above. In response to receiving the second search request, the reprogrammable circuit module 620 can be configured to change from the second configuration to a third configuration that is associated with executing a search process for the second search request. Furthermore, at the third configuration, the reprogrammable circuit module 620 can be configured to execute the search process for the second search request in a similar way to that for the previous search request as described above.

Figure 7:
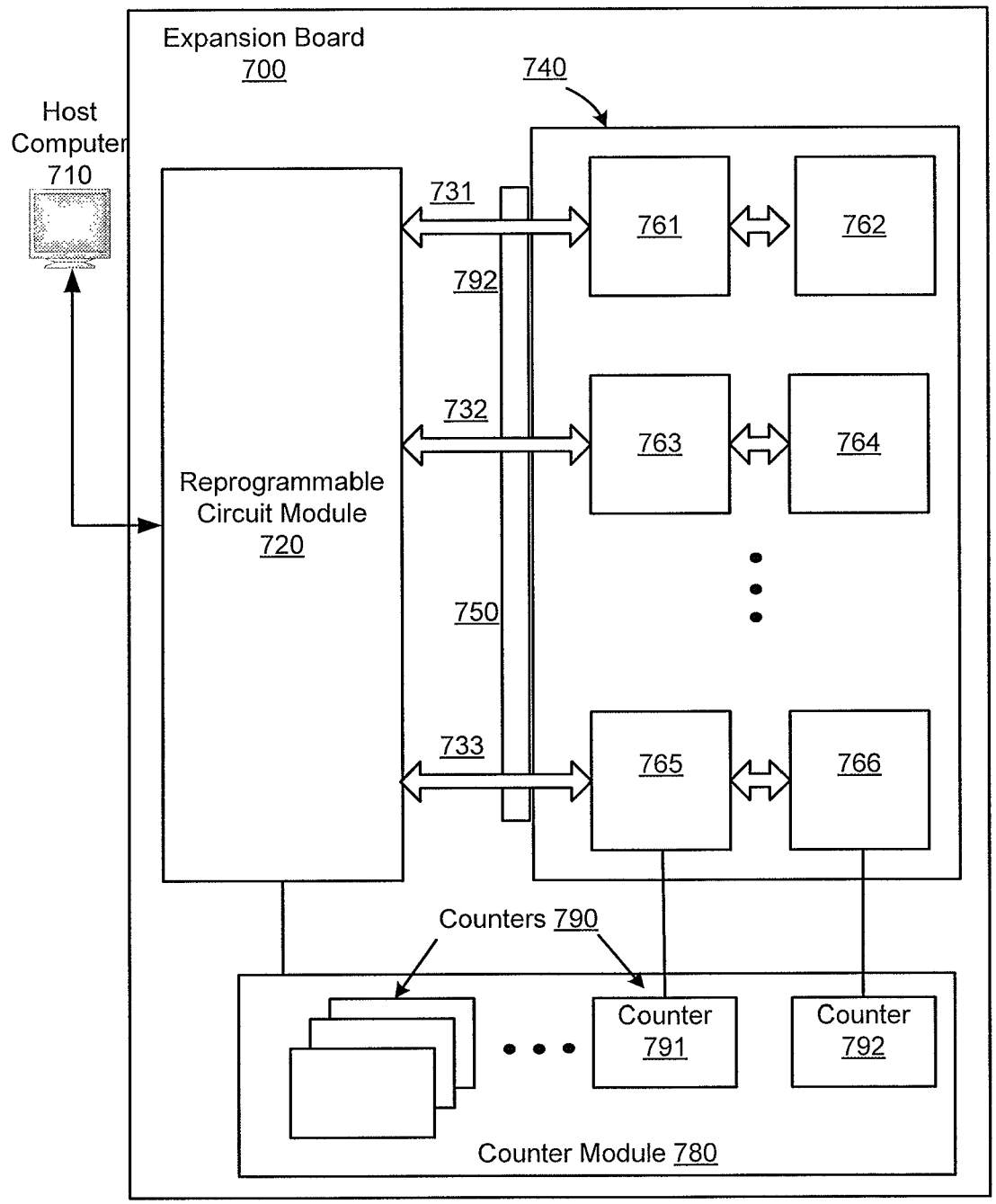
FIG. 7 is a schematic illustration of a reprogrammable circuit module and a counter module configured to manage access operations on memory blocks, according to an embodiment.

FIG. 7 is a schematic illustration of a reprogrammable circuit module 720 and a counter module 780 configured to manage access operations on memory blocks, according to an embodiment. The system in FIG. 7 can be structurally and functionally similar to the system shown and described with respect to FIGS. 1, 4 and 6. Specifically, the reprogrammable circuit module 720 can be a portion of an expansion board 700, which is operatively coupled to a host computer 710. A set of memory modules, including memory modules 761-766, are included in a replaceable memory package 740 that is coupled to the expansion board 700 via a socket 750. Each memory module from the set of memory modules 761-766 in the memory package 740 is operatively coupled to the reprogrammable circuit module 720 via a data channel, such as data channels 731-733. Each memory module from the set of memory modules 761-766 in the memory package 740 includes one or more memory blocks, each of which contains a certain memory space of a fixed block size (e.g., 16 kB, 32 kB, etc.).

As shown in FIG. 7, the reprogrammable circuit module 720 and/or the set of memory modules 761-766 in the memory package 740 is operatively coupled to a counter module 780, which includes a set of counters 790 (e.g., counters 791, 792). Each counter 790 is associated with a memory block at a memory module 761-766 in the memory package 740. In some embodiments, each counter 790 can be operatively coupled to its associated memory block. For example, the counter 791 is associated with and operatively coupled to a memory block at the memory module 765; the counter 792 is associated with and operatively coupled to another memory block at the memory module 766.

In some embodiments, each counter 790 included in the counter module 780 can be, for example, a process, application, virtual machine, and/or some other software module (stored and/or executing in hardware) or a hardware module, which is configured to record information associated with access operations for the memory block associated with that counter 790. Each counter 790 included in the counter module 780 can be located or hosted at, for example, a memory portion of the reprogrammable circuit module 720, a memory module 761-766 of the memory package 740 (e.g., the memory module associated with that counter 790), or any other suitable memory location within the expansion board 700.

Each counter 790 can be configured to store and update information associated with access operations for the memory block associated with that counter 790. Such information can be, for example, a number of times that the memory block has been accessed (e.g., for storing data, for retrieving data) within a certain time period, a rate associated with accessing the memory block, and/or the like. For example, the counter 791 is configured to store and update a number of times that the memory block at the memory module 765 associated with the counter 791 has been accessed within last 1 millisecond. For another example, the counter 792 is configured to store and update a rate at which the memory block at the memory module 766 associated with the counter 792 is currently accessed. Furthermore, in some embodiments, each counter 790 can be controlled and modified (e.g., incremented, decremented, cleared, etc.) by the reprogrammable circuit module 720.

In some embodiments, the set of counters 790 can be stored in, for example, a set of registers within the expansion board 700. In such embodiments, a user can obtain information associated with usage of the set of memory modules 761-766 from the set of counters 790 by checking the set of registers. For example, the user can periodically check the registers to obtain the number or rate of access operations associated with the set of memory modules 761-766.

In some embodiments, the reprogrammable circuit module 720 can be configured to access memory blocks at the set of memory modules 761-766 in the memory package 740 for various operations such as, for example, storing data, retrieving data, and/or the like. As described with respect to FIGS. 4 and 6, the reprogrammable circuit module 720 can be configured to select a memory block for an access operation (e.g., storing data, retrieving data). For example, the reprogrammable circuit module 720 can be configured to select the memory block associated with the counter 791 to store a data item. For another example, the reprogrammable circuit module 720 can be configured to select the memory block associated with the counter 792 to retrieve a data item. In some embodiments, as described below with respect to FIG. 8, the reprogrammable circuit module 720 can be configured to select a memory block using, for example, a hash function.

In response to the reprogramming circuit module 720 selecting a memory block, the counter module 780 can be configured to increment a counter 790 that stores a number of access operations associated with the selected memory block. In some embodiments, after the memory block is selected at the reprogrammable circuit module 720, the reprogrammable circuit module 720 can be configured to send a signal containing information associated with the selected memory block to the counter module 780. Accordingly, the counter module 780 can be configured to increment a number of access operations stored in the counter 790 associated with the selected memory block. For example, after the reprogrammable circuit module 720 selects the memory block associated with the counter 791 for an operation to store data, the reprogrammable circuit module 720 can be configured to send a signal containing information associated with that memory block to the counter module 780. As a result, the counter module 780 can be configured to increment the number of access operations stored in the counter 791 by 1. In such embodiments, the counter module 780 is operatively or directly coupled to the reprogrammable circuit module 720.

Alternatively, in some other embodiments, the counter module 780 can be configured to monitor access operations on the memory modules 761-766 in the memory package 740. Specifically, after the access operation is performed at the selected memory block, the counter module 780 can be configured to receive an indication of the access operation from the memory package 740 (e.g., from the memory module 761-766 that includes the selected memory block). Accordingly, the counter module 780 can be configured to increment the number of access operations stored in the counter 790 associated with the selected memory block. For example, after the reprogrammable circuit module 720 selects the memory block associated with the counter 792 for an operation to retrieve data, the reprogrammable circuit module 720 can be configured to access the selected memory block and retrieve data from that memory block. The counter module 780 can be configured to receive an indication of the access operation from the memory package 740. As a result, the counter module 780 can be configured to increment the number stored in the counter 792 by 1. In such embodiments, the counter module 780 is operatively or directly coupled to the memory modules 761-766 of the memory package 740.

In some embodiments, the counter module 780 can be configured to decrement or perform other operations on a counter 790 that stores a number of access operations associated with a memory block. For example, the counter module 780 can be configured to clear a counter 790 to 0 after the memory block associated with that counter 790 not being accessed for a certain time period. For another example, the counter module 780 can be configured to set a counter 790 to a certain value based on an instruction, command or indication received from the reprogrammable circuit module 720, the memory package 740 or any other component, module or an operator.

In some embodiments, the counter module 780 can be configured to adjust (e.g., increment, decrement) a counter 790 with an adjustment of any arbitrary value (e.g., a number more than 1, a number less than 1) based on any suitable factor associated with the access operations. For example, the counter module 780 can be configured to increment a counter 790 by a number of bytes (or bits) that are accessed in the memory block associated with that counter 790. For another example, the counter module 780 can be configured to increment a counter 790 by a first number (e.g., 1) if the memory block associated with that counter 790 is accessed for a read operation, or by a second number (e.g., 2) different from the first number if that memory block is accessed for a write operation.

Similar to the scenario of a counter 790 that stores a number of access operations being adjusted as described above, the counter module 780 can be configured to adjust or change a counter 790 that stores a rate or any other information associated with access operations. For example, in response to an access operation performed (or to be performed) on a memory block, the counter module 780 can be configured to recalculate and then update a counter 790 that stores a rate of access operations associated with that memory block. In some embodiments, for example, the rate of operations can be recalculated and updated after each access operation. In some other embodiments, for example, the rate of operations can be calculated and updated periodically (e.g., every 10 millisecond) independent of access operations.

In some embodiments, the counter module 780 can be configured to determine a distribution of access operations across the memory blocks within one or more memory modules 761-766 of the memory package 740. Such a distribution can include information associated with the access operations across the memory blocks such as, for example, an average number of access operations across all memory blocks, a maximum number of access operations at the memory blocks, a minimum number of access operations at the memory blocks, a difference between the maximum number and the minimum number of access operations at the memory blocks, and/or the like. Based on such a distribution, the counter module 780 can be configured to determine, for example, a level of uniformity that measures how uniformly the access operations have been distributed across the memory blocks within the one or more memory modules 761-766 of the memory package 740.

In some embodiments, the counter module 780 can be configured to transmit a signal (e.g., to the reprogrammable circuit module 720) in response to a counter 790 crossing a threshold. Such a signal can be an indication of, for example, an overused memory block, an underused memory block, and/or any other type of abnormal usage of the memory block associated with that counter 790. In some embodiments, such a threshold can be a function of the remaining counters from the set of counters 790. For example, the threshold can be a sum of the minimum number from the remaining counters 790 and a system parameter, which represents a maximum allowable distance (in terms of the number of access operations) between any two memory blocks. Such a system parameter can be predetermined by, for example, an operator or administrator. Thus, if a counter 790 is larger than the sum of the minimum number from the remaining counters 790 and the system parameter, the counter module 780 is triggered to transmit a signal. For another example, the threshold can be a rate value that is twice of the average of all the counters 790 that store a rate of access operations. Thus, if a counter 790 is larger than twice of the average of all the counters 790 that store a rate of access operations, the counter module 780 is triggered to transmit a signal. In some other embodiments, such a threshold can be a predetermined value (e.g., 1000, 100/millisecond) that is independent of the remaining counters from the set of counters 790.

In some embodiments, in response to receiving the signal from the counter module 780, the reprogrammable circuit module 720 can be configured to perform an action. In some embodiments, for example, the reprogrammable circuit module 720 can be configured to change the method to select memory blocks for access operations. In such embodiments, the reprogrammable circuit module 720 can be configured to change a probability that a memory block is selected for access operations. That is, the reprogrammable circuit module 720 can be configured to select a memory block for an access operation with a first probability. In response to receiving a signal from the counter module 780 indicating an abnormal usage of the memory block (e.g., overused, underused), the reprogrammable circuit module 720 can be configured to modify the method to select memory blocks for access operations, such that that memory block is selected for an access operation with a second probability different from the first probability.

For example, the reprogrammable circuit module 720 can receive a signal from the counter module 780 indicating that the memory block associated with the counter 791 has been overly accessed for storing data items. In response to the signal, the reprogrammable circuit module 720 can be configured to modify the method to select memory blocks for access operations (e.g., storing data) such that the memory block associated with the counter 791 is no longer selected for storing data. For another example, the reprogrammable circuit module 720 can receive a signal from the counter module 780 indicating that the memory block associated with the counter 792 has not been adequately accessed for retrieving data. In response to the signal, the reprogrammable circuit module 720 can be configured to move data to be retrieved to the memory block associated with the counter 792, and modify the method to select memory blocks for access operations (e.g., retrieving data) such that the memory block associated with the counter 792 is more frequently selected for retrieving data.

In some embodiments, as described with respect to FIG. 8, the reprogrammable circuit module 720 can be configured to modify a hash function that is used to select memory blocks for access operations. In some embodiments, the hash function can be modified such that access operations can be, for example, (substantially) uniformly distributed across the memory blocks included in the memory package 740. In some other embodiments, the hash function can be modified such that access operations can be distributed across the memory blocks according to any other suitable distribution.

In some embodiments, in response to the reprogrammable circuit module 720 receiving a signal from the counter module 780 indicating that a memory block has been overused, various actions can be taken accordingly. For example, the reprogrammable circuit module 720 can be configured to move data stored in the overused memory block to another memory block that has not been overused. For another example, the memory module including the overused memory block can be replaced (e.g., by an operator) with a new memory module. For yet another example, the reprogrammable circuit module 720 can be configured to refresh the data stored in the overused memory block.

FIG. 8 is a flow chart illustrating a method 800 for accessing memory modules based on data items, according to an embodiment. The method 800 can be performed at a reprogrammable circuit module that can be structurally and functionally similar to the reprogrammable circuit module 620 shown and described with respect to FIG. 6. Particularly, the reprogrammable circuit module performing the method 800 can be a portion of an expansion board (e.g., the expansion board 600 in FIG. 6) that is operatively coupled to, for example, a host computer (e.g., the host computer 610 in FIG. 6). A set of memory modules (e.g., the memory modules 661-666 in FIG. 6) can be included in a replaceable memory package (e.g., the memory package 640 in FIG. 6) that is coupled to the expansion board via a socket (e.g., the socket 650 in FIG. 6). Furthermore, each memory module from the set of memory modules in the memory package can be operatively coupled to the reprogrammable circuit module via a data channel (e.g., the data channels 631-633 in FIG. 6).

At 802, a query associated with a data lookup can be received at the reprogrammable circuit module, where the query includes a first data item and a second data item. Such a query can be received from, for example, the host computer. In some embodiments, the data lookup can be associated with an access operation (e.g., store data, search data, retrieve data, etc.) on the memory modules included in the memory package. The first data item and the second data item can be, for example, a binary string, a number, a keyword, or any other suitable type of data. In some embodiments, the first data item can be logically associated with the second data item. For example, the second data item can be immediately subsequent to the first data item in the query. For another example, the second data item can be an integer that is the successor of the first data item (i.e., the second data item is an integer that is one greater than the first data item). In the example of FIG. 6, the reprogrammable circuit module 620 can be configured to receive a query associated with a data lookup from the host computer 610. The query includes a first data item and a second data item that are logically associated (e.g., both data items are integer numbers and the second data item is the successor of the first data item).

At 804, a first physical memory address can be determined using the first data item as an input to a hash function. The hash function can be executed at the reprogrammable circuit module. In some embodiments, the result of the hash function can be the first physical memory address. In other embodiments, the result of the hash function can be used to determine the first physical memory address such as, for example, an identifier (e.g., an index number) associated with the first physical memory address. The first physical memory address is associated with a memory location (e.g., a memory block) at a first memory module coupled to the reprogrammable circuit module, where the first memory module is included within the expansion board. In the example of FIG. 6, the reprogrammable circuit module 620 can be configured to determine a first physical memory address using the first data item as an input to a hash function. The result of the hash function can be the first physical memory address, which is associated with, for example, a memory block at the memory module 662 in the memory package 640.

At 806, a second physical memory address can be determined using the second data item as an input to the hash function. In some embodiments, the result of the hash function can be the second physical memory address. In other embodiments, the result of the hash function can be used to determine the second physical memory address such as, for example, an identifier (e.g., an index number) associated with the second physical memory address. Similar to the first physical memory address, the second physical memory address is associated with a memory location at a second memory module coupled to the reprogrammable circuit module, where the second memory module is also included within the expansion board. In some embodiments, the second physical memory address can be different from the first physical memory address, and/or the second memory module can be different from the first memory module. In the example of FIG. 6, the reprogrammable circuit module 620 can be configured to determine a second physical memory address using the second data item as an input to the hash function. The result of the hash function can be the second physical memory address, which is associated with, for example, a memory block at the memory module 665 in the memory package 640.

At 808, the first memory module can be accessed using the first physical memory address during a first time period. Furthermore, in some embodiments, the reprogrammable circuit module can be configured to store the first data item at the memory location at the first memory module associated with the first physical memory address. In some other embodiments, the reprogrammable circuit module can be configured to perform any other suitable operation (e.g., search data, retrieve data) at the memory location at the first memory module associated with the first physical memory address. In the example of FIG. 6, the reprogrammable circuit module 620 can be configured to access the memory block at the memory module 662 using the first physical memory address. Furthermore, the reprogrammable circuit module 620 can be configured to store data including the first data item into the memory block at the memory module 662 associated with the first physical memory address.

At 810, the second memory module can be accessed using the second physical memory address during a second time period. In some embodiments, the second time period at least partially overlaps the first time period. That is, the reprogrammable circuit module can be configured to access the first memory module and the second memory module substantially simultaneously. Similar to the case of the first data item, in some embodiments, the reprogrammable circuit module can be configured to store the second data item, and/or perform any other suitable operation, at the memory location of the second memory module associated with the second physical memory address. In the example of FIG. 6, the reprogrammable circuit module 620 can be configured to access the memory block at the memory module 665 using the second physical memory address. Furthermore, the reprogrammable circuit module 620 can be configured to store data including the second data item into the memory block at the memory module 665 associated with the first physical memory address. In some embodiments, the reprogrammable circuit module 620 can be configured to store data at the memory module 662 and store data at the memory module 665 substantially simultaneously.

In some embodiments, the hash function used to determine physical memory addresses at the reprogrammable circuit module can be a hash function that randomly associates physical memory addresses with input data items. That is, data items that are logically associated can be associated with random physical memory addresses (i.e., not logically associated) using the hash function. In the example of FIG. 6 described above, the first data item and the second data item are logically associated (e.g., sequentially), while the first physical memory address (at the memory module 662) determined based on the first data item is not logically associated with the second physical memory address (at the memory module 665) determined based on the second data item. As a result, memory locations within the set of memory modules can be randomly accessed by the reprogrammable circuit module 620 based on input data items.

In some embodiments, the hash function used to determine physical memory addresses at the reprogrammable circuit module can be modified by, for example, a driver module. In some embodiments, such a driver module can be executed at the host computer operatively coupled to the reprogrammable circuit module. In some embodiments, the hash function can be modified such that a certain distribution of access operations at the set of memory modules can be achieved. For example, the hash function can be modified such that the physical memory addresses determined based on the input data items can be substantially uniformly distributed across the set of memory modules. As a result, the memory locations within the set of memory modules can be substantially uniformly accessed based on the input data items.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIGS. 1 and 4 as an address translation table being included in a memory module, in other embodiments, a copy of an address translation table can be stored in a reprogrammable circuit module. In such embodiments, a physical memory address associated with a logical memory address can be retrieved from the copy of the address translation table at the reprogrammable circuit module, without sending a query to the address translation table stored in the memory module. For example, in FIG. 1, a copy of the address translation table 180 can be stored at the reprogrammable circuit module 120. Thus, the reprogrammable circuit module 120 does not need to send a query to the address translation table 180 at the memory module 162.

While shown and described above with respect to FIGS. 1 and 4 as an expansion board including one reprogrammable circuit module connected to only one memory package, in other embodiments, more than one memory packages can be connected to a reprogrammable circuit module in an expansion board. In some embodiments, for example, a reprogrammable circuit module can be coupled to four memory packages on one expansion board, where each of the memory packages contains 16 memory modules. As a result, in such embodiments, the reprogrammable circuit module can be configured to retrieve data from up to 64 memory modules at the same time, via parallel data channels. In other embodiments, a reprogrammable circuit module can be coupled to any number of memory packages, each of which contains any number of memory modules. As a result, in such embodiments, the reprogrammable circuit module can be configured to retrieve data from any number of memory modules at the same time, via parallel data channels. Furthermore, a SLFM system can be configured to employ parallel processing channels with a large array of multiple reprogrammable circuit modules (e.g., FPGAs), where each of the multiple reprogrammable circuit modules has a similar structure and functionality as the reprogrammable circuit module described herein. Inherently, the SLFM system can be scalable by increasing the number of FPGAs and the associated FPGA processing channels.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code. Such computer code can also be referred to as a computer program and some embodiments can be in the form of a computer program.

What is claimed is:

1. An apparatus, comprising:
a plurality of memory modules, each memory module from the plurality of memory modules configured to store data to be retrieved in a data match computation;
a reprogrammable circuit module configured to execute the data match computation, the reprogrammable circuit module configured to receive data to be computationally and actively matched;
a plurality of data channels, each data channel from the plurality of data channels operably coupling the reprogrammable circuit module to at least one memory module from the plurality of memory modules, the reprogrammable circuit module configured to retrieve (1) a first set of data stored at a first memory module from the plurality of memory modules via a first data channel from the plurality of data channels, and in parallel (2) a second set of data stored at a second memory module from the plurality of memory modules via a second data channel from the plurality of data channels, to produce retrieved data including the first set of data and the second set of data, the reprogrammable circuit module configured to store the retrieved data for a time period, the reprogrammable circuit module configured to computationally and actively compare, during the time period and entirely at the reprogrammable circuit module, the retrieved data with a representation of the data to be matched to produce matched data, the reprogrammable circuit module configured to send a result signal representing the matched data; and
a driver module operatively coupled to the reprogrammable circuit module, the reprogrammable circuit module configured to be modified by the driver module, the driver module configured to modify the reprogrammable circuit module, at a first time, to retrieve data based at least in part on a first keyword, the driver module configured to modify the reprogrammable circuit module, at a second time after the first time, to retrieve data based at least in part on a second keyword different from the first keyword.

2. The apparatus of claim 1, wherein each memory module from the plurality of memory modules is included in a dual in-line memory module (DIMM).

3. The apparatus of claim 1, wherein the reprogrammable circuit module is configured to retrieve data from the first memory module at substantially a same time as from the second memory module.

4. The apparatus of claim 1, wherein the reprogrammable circuit module is a Field Programmable Gate Array (FPGA).

5. The apparatus of claim 1, wherein each memory module from the plurality of memory modules is a flash memory module.

6. The apparatus of claim 1, wherein the plurality of memory modules are removably coupled to a Peripheral Component Interconnect Express (PCIe) card including the reprogrammable circuit module.

7. The apparatus of claim 1, wherein the reprogrammable circuit module is configured to generate a data match result based at least in part on the matched data, the data match result being different from the matched data.

8. The apparatus of claim 1, wherein each memory module from the plurality of memory modules is associated with an address translation table configured to store a plurality of address pairs, the address translation table being located at the first memory module.

9. The apparatus of claim 1, wherein each memory module from the plurality of memory modules is configured to store data having a plurality of addresses, the data to be computationally and actively matched does not include an address from the plurality of addresses.

10. The apparatus of claim 1, wherein the reprogrammable circuit module is configured to computationally and actively compare the retrieved data without using a processor separate from the reprogrammable circuit module.

11. A method, comprising:
receiving a query associated with a data match computation;
retrieving a set of data, based at least in part on the query and during a first time period, from a first memory module from a plurality of memory modules via a first data channel, to produce first retrieved data including the set of data from the first memory module;
retrieving a set of data, based at least in part on the query, in parallel to the retrieving from the first memory module via the first data channel, and during a second time period overlapping the first time period, from a second memory module from the plurality of memory modules via a second data channel, to produce second retrieved data including the set of data from the second memory module;
storing, at a reprogrammable circuit module, the first retrieved data and the second retrieved data for a time period;
producing, during the time period, matched data by computationally and actively comparing, entirely at the reprogrammable circuit module, the first retrieved data and the second retrieved data to a representation of the query;
sending, to a compute device, a result signal representing the matched data;
retrieving data, at a first time, based at least in part on a first keyword and a communication from a driver module; and
retrieving data, at a second time after the first time, based at least in part on a second keyword different from the first keyword and a communication from the driver module.

12. The method of claim 11, wherein the first memory module is included within a common dual in-line memory module (DIMM) as the second memory module.

13. The method of claim 11, wherein the first memory module is a flash memory module.

14. The method of claim 11, further comprising:
generating a data match result based at least in part on the matched data, the data match result being different from the matched data.

15. The method of claim 11, wherein the first memory module and the second memory module are configured to store data having a plurality of addresses, the query associated with the data match computation does not include an address from the plurality of addresses.

16. An apparatus, comprising:
a plurality of memory modules, each memory module from the plurality of memory modules configured to store data to be retrieved;
a reprogrammable circuit module configured to receive data to be computationally and actively matched, the reprogrammable circuit module configured to retrieve a first set of data from a first memory module from the plurality of memory modules, and in parallel a second set of data from a second memory module from the plurality of memory modules to produce retrieved data, the retrieved data including the first set of data and the second set of data, the reprogrammable circuit module configured to store the retrieved data for a time period, the reprogrammable circuit module configured to computationally and actively compare, during the time period and entirely at the reprogrammable circuit module, the retrieved data with a representation of the data to be matched to produce matched data, the reprogrammable circuit module configured to send a result signal representing the matched data; and
a driver module operatively coupled to the reprogrammable circuit module, the reprogrammable circuit module configured to be modified by the driver module, the driver module configured to modify the reprogrammable circuit module, at a first time, to retrieve data based at least in part on a first keyword, the driver module configured to modify the reprogrammable circuit module, at a second time after the first time, to retrieve data based at least in part on a second keyword different from the first keyword.

17. The apparatus of claim 16, wherein the second memory module is different than the first memory module.

18. The apparatus of claim 16, wherein the driver module is configured to modify the reprogrammable circuit module, at a first time, to perform a first task, the driver module configured to modify the reprogrammable circuit module, at a second time after the first time, to perform a second task.

19. The apparatus of claim 16, wherein the reprogrammable circuit module is configured to generate a data match result based on the matched data, the data match result being different from the matched data.

20. The apparatus of claim 16, wherein each memory module from the plurality of memory modules is associated with an address translation table configured to store a plurality of address pairs, the address translation table being collocated with at least a portion of the data to be retrieved.

* * * * *